US007714072B2

(12) United States Patent
Michie, Jr. et al.

(10) Patent No.: US 7,714,072 B2
(45) Date of Patent: May 11, 2010

(54) POLYMER COMPOSITION AND PROCESS TO MANUFACTURE HIGH MOLECULAR WEIGHT-HIGH DENSITY POLYETHYLENE AND FILM THEREFROM

(75) Inventors: William J. Michie, Jr., Missour City, TX (US); Anthony C. Neubauer, Piscataway, NJ (US); Brad A. Cobler, Lake Jackson, TX (US); Carl F. Baker, Lake Jackson, TX (US)

(73) Assignee: Dow Global Technologies Inc, Midland, MI (US)

( * ) Notice: Subject to any disclaimer, the term of this patent is extended or adjusted under 35 U.S.C. 154(b) by 880 days.

(21) Appl. No.: 10/553,788

(22) PCT Filed: May 5, 2004

(86) PCT No.: PCT/US2004/013975

§ 371 (c)(1),
(2), (4) Date: Oct. 20, 2005

(87) PCT Pub. No.: WO2004/101674

PCT Pub. Date: Nov. 25, 2004

(65) Prior Publication Data

US 2007/0043177 A1 Feb. 22, 2007

Related U.S. Application Data

(60) Provisional application No. 60/469,665, filed on May 12, 2003.

(51) Int. Cl.
*C08F 8/06* (2006.01)
*C08L 23/30* (2006.01)
*C08F 2/34* (2006.01)

(52) U.S. Cl. .................. 525/192; 525/240; 525/333.8; 525/938; 526/65; 528/502 A

(58) Field of Classification Search .............. 526/65, 526/348; 525/333.8, 192, 240, 938; 528/502 A
See application file for complete search history.

(56) References Cited

U.S. PATENT DOCUMENTS 3,280,220 A    10/1966   Nelson (Continued)

FOREIGN PATENT DOCUMENTS

EP         0302242 B1    7/1988

(Continued)

OTHER PUBLICATIONS

Zimm, G.H. and Stockmayer, W.H., *J Chem. Phys.*, 17, 1301 (1949).

(Continued)

*Primary Examiner*—Fred M Teskin

(57) ABSTRACT

The present invention is a multimodal polyethylene composition having (1) a density of at least about 0.940 g/cm$^3$; (2) a melt flow index ($I_5$) of from about 0.2 to about 1.5 g/10 mm; (3) a melt flow index ratio ($I_{21}/I_5$) of from about 20 to about 50; (4) a molecular weight distribution, Mw/Mn, of from about 20 to about 40; and (5) a bubble stability measured on an HS50S stationary extrusion system with an BF 10-25 die, HK 300 air ring, A8 take off, and WS8 surface winder, with a 100 mm die diameter having a 50 mm 21:1 L/D grooved feed extruder used for a film of about 6×10$^{-6}$ m thickness of at least about 1.22 m/s line speed, at least about 45 kg/hr (0.013 kg/sec) output rate, or at least about 0.5 lb/hr/rpm (0.0000011 kg/s/rps) specific output rate or a combination thereof.

11 Claims, 1 Drawing Sheet

U.S. PATENT DOCUMENTS

| | | |
|---|---|---|
| 3,592,880 A | 7/1971 | Diedrich et al. |
| 3,914,342 A | 10/1975 | Mitchell |
| 4,048,412 A | 9/1977 | Caumartin et al. |
| 4,307,209 A | 12/1981 | Morita |
| 4,338,424 A | 7/1982 | Morita et al. |
| 4,352,915 A | 10/1982 | Mashita et al. |
| 4,390,666 A | 6/1983 | Moriguchi et al. |
| 4,414,369 A | 11/1983 | Kuroda et al. |
| 4,420,592 A | 12/1983 | Kato et al. |
| 4,438,238 A | 3/1984 | Fukushima et al. |
| 4,461,873 A | 7/1984 | Bailey et al. |
| 4,511,704 A | 4/1985 | Tanaka et al. |
| 4,522,987 A | 6/1985 | Hogan et al. |
| 4,543,399 A | 9/1985 | Jenkins et al. |
| 4,547,551 A | 10/1985 | Bailey et al. |
| 4,550,143 A | 10/1985 | Tanaka et al. |
| 4,588,790 A | 5/1986 | Jenkins |
| 4,603,173 A | 7/1986 | Mack et al. |
| 4,665,143 A | 5/1987 | Ahluwalia et al. |
| 4,703,094 A | 10/1987 | Raufast |
| 4,786,697 A | 11/1988 | Cozewith et al. |
| 4,789,714 A | 12/1988 | Cozewith et al. |
| 4,790,676 A | 12/1988 | Karatsu |
| 4,792,588 A | 12/1988 | Suga et al. |
| 4,835,219 A | 5/1989 | Tajima et al. |
| 4,859,749 A | 8/1989 | Franke |
| 4,882,400 A | 11/1989 | Dumain et al. |
| 4,963,622 A | 10/1990 | Heitz |
| 4,996,011 A | 2/1991 | Sano et al. |
| 5,019,627 A | 5/1991 | Honma et al. |
| 5,032,562 A | 7/1991 | Lo et al. |
| 5,047,468 A | 9/1991 | Lee et al. |
| 5,082,902 A | 1/1992 | Gurevitch et al. |
| 5,102,955 A | 4/1992 | Calabro et al. |
| 5,126,398 A | 6/1992 | Lee et al. |
| 5,166,281 A | 11/1992 | Chamla |
| 5,258,449 A | 11/1993 | Firdaus et al. |
| 5,260,384 A | 11/1993 | Morimoto et al. |
| 5,278,272 A | 1/1994 | Lai et al. |
| 5,284,613 A | 2/1994 | Ali et al. |
| 5,290,745 A | 3/1994 | Jorgensen et al. |
| 5,306,775 A | 4/1994 | Martin et al. |
| 5,332,706 A | 7/1994 | Nowlin et al. |
| 5,338,589 A | 8/1994 | Bohm et al. |
| 5,352,749 A | 10/1994 | DeChellis et al. |
| 5,371,146 A | 12/1994 | Takahashi |
| 5,374,700 A | 12/1994 | Tsutsui |
| 5,380,803 A | 1/1995 | Coutant et al. |
| 5,382,630 A | 1/1995 | Stehling et al. |
| 5,387,749 A | 2/1995 | Govoni et al. |
| 5,399,540 A | 3/1995 | Kuo et al. |
| 5,405,817 A | 4/1995 | Kuo et al. |
| 5,405,901 A | 4/1995 | Daniell |
| 5,408,015 A | 4/1995 | Hsieh et al. |
| 5,436,304 A | 7/1995 | Griffin et al. |
| 5,455,303 A | 10/1995 | Panagopoulos et al. |
| 5,459,217 A | 10/1995 | Todo et al. |
| 5,464,905 A | 11/1995 | Tsutsui et al. |
| 5,464,906 A | 11/1995 | Patton et al. |
| 5,473,028 A | 12/1995 | Nowlin et al. |
| 5,478,898 A | 12/1995 | Standaert et al. |
| 5,494,871 A | 2/1996 | Brun et al. |
| 5,494,965 A | 2/1996 | Harlin et al. |
| 5,503,914 A | 4/1996 | Michie et al. |
| 5,519,091 A | 5/1996 | Tsutsui et al. |
| 5,525,678 A | 6/1996 | Mink et al. |
| 5,527,867 A | 6/1996 | Bergmeister |
| 5,539,076 A | 7/1996 | Nowlin et al. |
| 5,635,262 A | 6/1997 | Best et al. |
| 5,648,422 A | 7/1997 | Collina et al. |
| 5,688,865 A | 11/1997 | Ali et al. |
| 5,693,719 A | 12/1997 | Goto et al. |
| 5,728,335 A | 3/1998 | Neubauer |
| 5,728,353 A | 3/1998 | Govoni et al. |
| 5,925,448 A | 7/1999 | Moy et al. |
| 6,028,140 A | 2/2000 | Collina et al. |
| 6,107,454 A | 8/2000 | Schmieg et al. |
| 6,124,428 A | 9/2000 | Schmieg et al. |
| 6,124,520 A | 9/2000 | Roberts |
| 6,147,167 A | 11/2000 | Mack et al. |
| 6,180,721 B1 | 1/2001 | Rogestedt et al. |
| 6,185,349 B1 | 2/2001 | Dammert |
| 6,187,866 B1 | 2/2001 | Jorgensen et al. |
| 6,194,520 B1 | 2/2001 | Cheruyu et al. |
| 6,218,472 B1 | 4/2001 | Debras et al. |
| 6,225,420 B1 | 5/2001 | Palmqvist et al. |
| 6,242,543 B1 | 6/2001 | Follestad et al. |
| 6,248,831 B1 | 6/2001 | Maheshwari et al. |
| 6,316,546 B1 | 11/2001 | Ong et al. |
| 6,329,054 B1 | 12/2001 | Rogestedt et al. |
| 6,346,575 B1 | 2/2002 | Debras et al. |
| 6,372,864 B1 | 4/2002 | Brown |
| 6,388,017 B1 | 5/2002 | McDaniel |
| 6,433,095 B1 | 8/2002 | Laurent |
| 6,454,976 B1 | 9/2002 | Neubauer |
| 6,455,642 B1 | 9/2002 | Myhre et al. |
| 6,458,911 B1 | 10/2002 | Ong et al. |
| 6,479,589 B2 | 11/2002 | Debras et al. |
| 6,485,662 B1 | 11/2002 | Neubauer et al. |
| 6,486,270 B1 | 11/2002 | Garrison et al. |
| 6,486,284 B1 | 11/2002 | Karande et al. |
| 6,511,935 B2 | 1/2003 | Job |
| 6,518,376 B2 | 2/2003 | Benham et al. |
| 2002/0042472 A1 | 4/2002 | Ong et al. |
| 2003/0040588 A1 | 2/2003 | Garrison et al. |

FOREIGN PATENT DOCUMENTS

| | | |
|---|---|---|
| EP | 0398350 A2 | 11/1990 |
| EP | 0121740 B1 | 5/1991 |
| EP | 0435624 A1 | 7/1991 |
| EP | 0702030 A1 | 5/1992 |
| EP | 0503791 A1 | 9/1992 |
| EP | 0528523 A1 | 2/1993 |
| EP | 0551485 B1 | 2/1993 |
| EP | 0533160 A1 | 3/1993 |
| EP | 0574821 A2 | 12/1993 |
| EP | 0580930 A1 | 2/1994 |
| EP | 603935 A1 | 6/1994 |
| EP | 0619325 A1 | 10/1994 |
| EP | 0649860 A1 | 4/1995 |
| EP | 0517868 B1 | 11/1995 |
| EP | 0700769 | 3/1996 |
| EP | 369436 B1 | 5/1996 |
| EP | 0536160 A1 | 8/1998 |
| EP | 676418 | 7/2000 |
| EP | 0533452 A1 | 3/2003 |
| JP | 5 4100 445 | 1/1978 |
| JP | 54161657 | 6/1978 |
| JP | 5 4100 444 | 8/1979 |
| JP | 58013 605 | 1/1983 |
| JP | 162819/1985 | 2/1987 |
| JP | 162821/1984 | 2/1987 |
| JP | 62020543 A | 7/1987 |
| JP | 04106138 | 8/1990 |
| JP | 05255440 A | 10/1993 |
| JP | 05311016 A | 11/1993 |
| JP | 07126316 A | 11/1993 |
| JP | 07138321 A | 11/1993 |
| JP | 05320245 A | 12/1993 |
| JP | 07258480 A | 3/1994 |
| JP | 07070235 A | 5/1994 |
| JP | 06287363 A | 10/1994 |
| JP | 7276712 A | 10/1994 |

| | | | |
|---|---|---|---|
| JP | 07002922 A | 1/1995 |
| JP | 7017710 | 1/1995 |
| JP | 07070238-AA | 3/1995 |
| JP | 07258326 A | 10/1995 |
| JP | 07304830 A | 11/1995 |
| JP | 07309981 | 11/1995 |
| JP | 08003382 A | 1/1996 |
| JP | 08041253 A | 2/1996 |
| JP | 08003384 A | 10/1996 |
| JP | 08325332 | 12/1996 |
| JP | 2002 3025 I 4 | 10/2002 |
| WO | WO9207905 | 5/1992 |
| WO | WO9212182 | 7/1992 |
| WO | WO9217539 | 10/1992 |
| WO | WO9222565 A1 | 12/1992 |
| WO | WO9315118 | 8/1993 |
| WO | WO9406849(A1) | 3/1994 |
| WO | WO9412568 | 6/1994 |
| WO | WO9422948 A1 | 10/1994 |
| WO | WO9428064 | 12/1994 |
| WO | WO9507305 | 3/1995 |
| WO | WO95/10548 A1 | 4/1995 |
| WO | WO9513871 | 5/1995 |
| WO | WO9517434 | 6/1995 |
| WO | WO9526990 A1 | 10/1995 |
| WO | WO9534380 | 12/1995 |
| WO | WO9849209 | 11/1998 |
| WO | WO9948934 | 9/1999 |
| WO | WO9955749 | 11/1999 |
| WO | WO0018813 | 4/2000 |
| WO | WO0018814 | 4/2000 |
| WO | WO0022040 | 4/2000 |
| WO | WO00/58375 | 10/2000 |
| WO | WO2005012371 | 2/2005 |

OTHER PUBLICATIONS

Rudin, A., *Modern Methods of Polymer Characterization*, John Wiley & Sons, New York (1991) pp. 103-112.

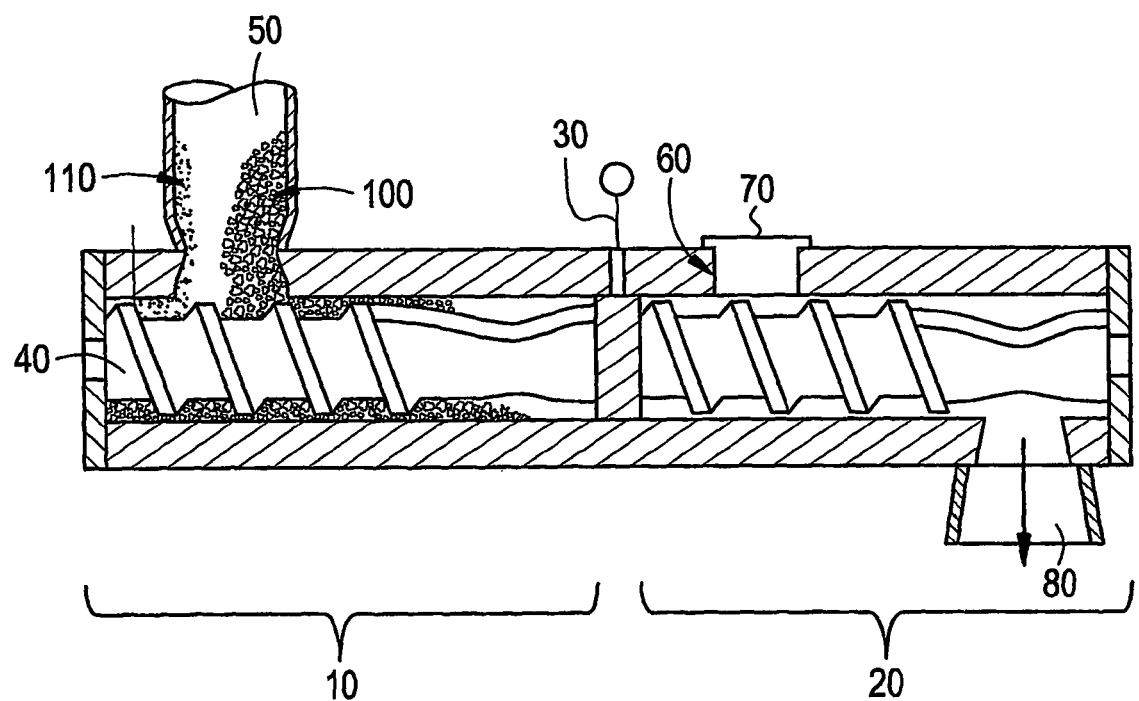

POLYMER COMPOSITION AND PROCESS TO MANUFACTURE HIGH MOLECULAR WEIGHT-HIGH DENSITY POLYETHYLENE AND FILM THEREFROM

CROSS REFERENCE TO RELATED APPLICATIONS

This application claims the benefit of U.S. Provisional Application No. 60/469,665, filed May 12, 2003.

STATEMENT REGARDING FEDERALLY SPONSORED RESEARCH OR DEVELOPMENT

Not Applicable

BACKGROUND OF THE INVENTION

The present invention is concerned with high molecular weight ("HMW"), high density ("HD") multimodal polyethylenes, a process for their production, and a film produced therefrom. In particular, the invention relates to a HMW HD multimodal polyethylene having superior dart impact properties and also a superior balance of extrudability, bubble stability, dart drop, and film appearance rating ("FAR").

DESCRIPTION OF THE PRIOR ART

High molecular weight ethylene homopolymers and copolymers typically exhibit improved strength and mechanical properties, including high tensile strength, impact strength and puncture resistance. However, attendant with such increases are difficulties in processability and extrudability of these HMW resins. One approach to solve this problem has been to broaden the molecular weight distribution of the HMW polyethylene. One method to achieve this is by catalyst selection, for instance, it is known that chromium catalysts tend to produce a product with broader molecular weight distribution than either traditional Ziegler-Natta or the newer metallocene-based catalyst systems.

Another method used to overcome the processing difficulties associated with HMW polyethylene has been to increase the molecular weight distribution of the polymer by providing a blend of a high molecular weight polyethylene with a low molecular weight ("LMW") polymer. The goal of such a formulation is to retain the excellent mechanical properties of the high molecular weight polyethylene, while also providing improvements in processability, resulting from the improved extrudability of the lower molecular weight component. For example, U.S. Pat. No. 6,458,911 B1 and U.S. Patent Publication No 2002/0042472 A1 disclose a bimodal ethylene polymer film resin comprising a polymer blend, of a LMW component and a HMW component. The blends are said to be capable of being formed into high strength thin films. Silica supported catalysts are used without further reduction of gel levels or crosslinking after treatment.

U.S. Pat. No. 6,433,095 B1, discloses a high density multimodal polyethylene having a shear ratio ($I_{21}/I_5$) of 18 or more and comprising at least 20 percent by weight of a HMW fraction, wherein high MWD fraction has: (a) a density of 0.930 g/cc or less; and (b) a high load melt index (HLMI) of 0.3 dg/min or less a high load melt index of 15 g/10 min or less.

U.S. Pat. No. 5,371,146 discloses an ethylene copolymer composition formed from two kinds of ethylene/alpha olefin copolymer which are said to be excellent in heat stability and melt tension and from which films of high transparency, mechanical strength and blocking resistance are said to be obtained.

EP 0528 523 A1 discloses an ethylene polymer consisting essentially of a bimodal blend of a HMW and LMW ethylene polymer. The blend has relatively low elasticity and molecular weight distribution and is said to be formed with good processability into thin gauge films with excellent dart impact and tear resistance.

EP 503 791 A1 discloses the use of staged reactors in which a HMW product is made in the first reactor and a LMW component in the second reactor The blends are said to exhibit a desirable combination of processability and mechanical properties.

U.S. Pat. No. 6,194,520 discloses a blend consisting of a HMW component, and a relatively low molecular weight component. The blends are said to be capable of being blow molded with excellent processability into articles with superior mechanical and other properties.

Finally, EP 0 533 452 A1 discloses the use of staged reactors in making a bimodal blend. A HMW product is made in the first reactor and a LMW component, in the second reactor. The HMW component is made with a hydrogen ethylene ratio ("$H_2/C_2$") no higher than 0.3, while the LMW component made in the second reactor is made with a $H_2/C_2$ of at least 0.9 and it is at least 8 times as high as in the first reactor.

Additional work has also centered on post reactor treatment of such bimodal blends to further improve their properties. For instance, U.S. Pat. No. 4,603,173 discloses a PE composition obtained by lightly branching a multicomponent resin. The branching is carried out by combining the resin with materials imparting free radicals and heating them at a temperature and a time sufficient to reduce the die swell by at least 2 percent when die swell is measured at a shear rate of 4125 sec$^{-1}$.

U.S. Pat. No. 4,390,666, discloses a crosslinked PE made from a blend of a HMW component and a LMW component. The two components are blended at ratios of 5:95 to 80:20 (HMW to LMW). The ratio of the expansion factors (crosslinked to original) is 1.1 to 10. The expansion factor is the ratio of the intrinsic viscosity in decalin at 135° C. to the intrinsic viscosity in dioctyladipate at 145° C.

EP 0 700 769 A2 describes a thermomechanical process for modifying polyethylene in the pelletization mixer in the presence of $O_2$ in the feed or before it is completely melted preferably without the presence of phosphite antioxidant and in the presence of hindered phenol type antioxidant and with zinc stearate to prevent discoloration.

Processes to make such blends can involve mechanical blending of the preformed and isolated individual blend components. However it is often preferable to produce such blends as so called "in-reactor blends" produced as a result of using a multiple reactor process in which the conditions in each reactor are varied to produce the required individual blend component "in situ."

There are many examples of such processes involving a variety of combinations of reactors and processes. For instance, U.S. Pat. Nos. 3,592,880 and 4,352,915 describe dual slurry reactor processes.

Also U.S. Pat. Nos. 5,494,965, 6,225,420 B1, 6,242,543 B1, 6,445,642 B1, and EP 0 517, 868 B1 and WO 94/22948 describe multiphase processes comprising a loop reactor followed by a gas phase reactor.

Also U.S. Pat. Nos. 5,126,398, 5,0476,468, 5,405,901, 5,503,914, and 5,925,448 and EP 369 436 B1 disclose in situ blends and processes for the in situ blending of polymers using at least two fluidized bed reactors connected in series.

However, industry retains a need for a resin able to exhibit an improved balance of extrudability, bubble stability, dart drop, and FAR while being able to be successfully extruded at all commercially required line speeds. There is also a need for a process to prepare such a resin, especially in a process, which uses an in situ method of preparation.

SUMMARY OF THE INVENTION

The present invention includes a multimodal polyethylene composition has (1) a density of at least about 0.940 g/cm$^3$ as measured by ASTM Method D-1505; (2) a melt flow index ($I_5$) of from about 0.2 to about 1.5 g/10 min (as measured by ASTM D-1238, measured at 190° C. and 5 kilograms); (3) a melt flow index ratio ($I_{21}/I_5$) of from about 20 to about 50; (4) a molecular weight distribution, Mw/Mn, of from about 20 to about 40; (5) a bubble stability measured on specified equipment according to specified conditions for a film of about 6×10$^{-6}$ m thickness of at least about 1.22 m/s line speed, at least about 45 kg/hr (0.013 kg/sec) output rate, or at least about 0.5 lb/hr/rpm (0.0000011 kg/s/rps) specific output rate or a combination thereof; and 6) a dart impact on 12.5 micron (1.25×10$^{-5}$ m) film of at least 300 g; the composition comprising; (A) a high molecular weight fraction which; (a) is present in an amount of from about 30 to about 70 weight percent (based on the total weight of the composition); (b) has a density of at least about 0.860 g/cm$^3$ as measured by ASTM D-1505; (c) has a melt flow index ($I_{21}$) of from about 0.01 to about 50 g/10 min (as measured by ASTM D-1238, measured at 190° C. and 21.6 kilograms); and (d) a melt flow index ratio ($I_{21}/I_5$) of from about 6 to about 12; and (B) a low molecular weight fraction which; (a) is present in an amount of from about 30 to about 70 weight percent (based on the total weight of the composition); (b) has a density of at least about 0.900 g/cm$^3$ as measured by ASTM D-1505; (c) has a melt flow index ($I_2$) of from about 0.5 to about 3000 g/10 min (as measured by ASTM D-1238, measured at 190° C. and 2.16 kilograms); (d) a melt flow index ratio ($I_{21}/I_5$) of from about 5 to about 15; and (e) is prepared using a mole ratio of alpha olefin to ethylene less than that of the higher molecular weight fraction and of less than or equal to about 0.01:1. The invention also includes a process for producing a multimodal ethylene polymer, which process comprises the following steps: (1) contacting in a first gas phase fluidized bed reactor under polymerization conditions and at a temperature of from about 70° C. to about 110° C., a supported titanium magnesium catalyst precursor, cocatalyst, and a gaseous composition, the gaseous composition having; (i) a mole ratio of alpha-olefin to ethylene of from about 0.01:1 to about 0.8:1; and optionally (ii) a mole ratio of hydrogen to ethylene of from about 0.001:1 to about 0.3:1, to produce a high molecular weight polymer (HMW); and (2) transferring the HMW polymer from step 1 to a second gas phase fluidized bed reactor under polymerization conditions and at a temperature of from about 70° C. to about 110° C., with a gaseous composition having; (i) a mole ratio of alpha-olefin to ethylene less than that used in making the HMW polymer and of from about 0.0005:1 to about 0.01:1; and (ii) a mole ratio of hydrogen (if present) to ethylene of from about 0.01:1 to about 3:1 to form a polymer blend product; and (3) melting the polymer blend product in an extruder having a mixer vent wherein; (ii) the mixture vent has an oxygen concentration of from about 0.05 to about 6 volume percent oxygen in nitrogen; and (ii) the extrusion temperature is sufficient to melt the polymer and achieve tailoring in the presence of oxygen; and (4) passing the molten polymer blend through one or more active screens, wherein in the case of two or more active screens, the screens are positioned in series, each active screen having a micron retention size of from about 2 to about 70, at a mass flux of about 1.0 to about 20 kg/s/m$^2$ to form a screened molten polymer blend. The composition is preparable by the process and is preferably prepared by the process. The resin exhibits improved extrusion processing at high commercial line speeds, while exhibiting an excellent balance of bubble stability, dart drop, and FAR. The process includes the following features: (i) minimization (but not total elimination) of comonomer in the low molecular weight component by controlling the comonomer feed to the low molecular weight reactor; (ii) increasing the Mw of the HMW component relative to commonly encountered bimodal polyethylene compositions, (iii) tailoring the final product by contacting the resin in the vent section of the mixer with a controlled oxygen atmosphere; and (iv) screening the molten polymer blend through one or more active screens. Increasing the molecular weight of the HMW component results in a broader final molecular weight distribution of the final blend.

BRIEF DESCRIPTION OF THE DRAWINGS

FIG. 1 illustrates a cross section schematic view of preferred extruder configuration for tailoring.

DETAILED DESCRIPTION OF THE INVENTION

The term "Melt Flow Index, $I_2$" is used herein interchangeably with the term "$I_2$" and is determined under ASTM D-1238, measured at 190° C. and 2.16 kilograms and reported as grams per 10 minutes or decigrams per minute.

The term "Melt Flow Index, $I_5$" is used herein interchangeably with the term "$I_5$" and is determined under ASTM D-1238, measured at 190° C. and 5 kilograms and reported as grams per 10 minutes or decigrams per minute.

The term "Melt Flow Index, $I_{21}$" is used herein interchangeably with the term "$I_{21}$" and is determined under ASTM D-1238, measured at 190° C. and 21.6 kilograms and reported as grams per 10 minutes or decigrams per minute.

The term "Melt Flow Ratio, $I_{21}/I_5$" as used herein is the ratio of $I_{21}$ to $I_5$.

The term "Melt Flow Ratio, $I_{21}/I_2$" as used herein is the ratio of $I_{21}$ to $I_2$.

The term "actual output rate" as used herein means the measured output of the extruder by weighing film extruded for 1 or 2 minutes (60 or 120 s) and then calculating an output rate in mass per unit time (kg/s).

The term "specific output rate" as used herein means the actual output rate divided by the screw frequency in revolutions per minute (rpm (rps)).

The term "tailoring" as used herein means controlled light crosslinking through the use of a controlled mixture of a free radical generator like $O_2$ gas (in $N_2$) in the mixer vent of an extruder under controlled temperatures of the molten polymer, at residence times commensurate with normal production rates of 30,000 to 55,000 pounds per hour (3.8 to 6.9 kg/s).

The term "storage modulus," G'(w) is defined as the stress in phase with the strain in a sinusoidal shear deformation divided by the strain. It is a measure of energy stored and recovered per cycle, when different systems are compared at the same strain amplitude. It is a function of the oscillating frequency w.

The term "loss modulus," G"(w) is defined as the stress 90 degrees out of phase with the strain divided by the strain. It is a measure of the energy dissipated or lost per cycle of sinusoidal deformation, when different systems are compared at the same strain amplitude. It is a function of the oscillating frequency w. Both the storage and loss modulus are well within the skill in the art, for instance as discussed by G. Marin, in "Oscillatory rheometry", Chapter 10 of Rheological Measurement, Edited by A. A. Collyer and D. W. Clegg, Elsevier, 1988.

The term "dynamic elasticity" refers to the ratio of G'(w)/G"(w).

All percentages, preferred amounts or measurements, ranges and endpoints thereof herein are inclusive, that is, "less than about 10" includes about 10.

Blend Preparation.

The blends of the present invention may be obtained by separately preparing the individual blend components and combining them with any suitable blending method. However, it is more preferred to prepare the blend composition in-situ in the gas phase using a continuous fluidized bed process featuring multiple reactors connected in series. While two reactors are preferred, three or more reactors may be used to further vary the polymer properties.

In a dual reactor configuration, the product from the first reactor can be isolated and its properties directly determined, however if the second reactor is sampled the product would be the final blend product and not that of the individual component said to be "made in that reactor." Thus, when properties of a blend component made in the second reactor are quoted herein, it is understood to mean that these properties would be those of a polymer made under the given second reactor conditions as if the reactor is isolated and not connected to the first reactor in the series.

For the preferred dual reactor process of the present invention, the high and low molecular weight blend components can each be made in any reactor in the series. For example the HMW component can be made in the first reactor and conditions varied in the second reactor so as to produce the LMW component, or alternatively the LMW component can be made in the first reactor and conditions varied in the second reactor so as to produce the HMW component. However it is preferred that they be made sequentially, with the HMW component first, to achieve greater blend homogeneity and composition control.

Catalyst Preparation

The catalysts used in the process to make the compositions of the present invention are of the Ziegler-Natta type. In particular, for the present gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent producing a high viscosity mixture, which is then used as catalyst precursor. Exemplary catalyst types are described in U.S. Pat. Nos. 6,187,866 and 5,290,745. Precipitated/crystallized catalyst systems such as those described in U.S. Pat. Nos. 6,511,935 and 6,248,831, may also be used.

The term "catalyst precursor" as used herein means a mixture comprising titanium and magnesium compounds and a Lewis Base electron donor. Preferably the catalyst precursor has the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is greater than 2 and up to 1.5*d+3. It is prepared from a titanium compound, a magnesium compound, and an electron donor.

The electron donor is an organic Lewis base, liquid at temperatures in the range of about 0° C. to about 200° C., in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains about 1 to about 20 moles of electron donor per mole of titanium compound and preferably about 1 to about 10 moles of electron donor per mole of titanium compound.

Since the catalyst will act as a template for the growth of the polymer, that the catalyst precursor is converted into a solid. The resultant solid advantageously has an appropriate particle size of about 25 microns ($2.5 \times 10^{-5}$ m) and an ellipsoidal to spherical shape to produce polymer particles with relatively narrow particle size distribution, for instance with a $d_{10}$ or the 10 number percent of the particle size distribution having a particle size of 8 microns, a $d_{90}$ or the 90 number percent of the particle size distribution having a particle size of 60 microns, low amounts of fines, for instance less than about 10 percent through a 120 mesh screen (125 micrometers, $1.25 \times 10^{-4}$ m) and good fluidization characteristics, for instance of superficial velocities at least about 1.5 ft/s (0.457 m/s), as recognized by those skilled in the art. Although this solution of Lewis base, magnesium and titanium compounds may be impregnated into a porous support and dried to form a solid catalyst, it is preferred that the solution be converted into a solid catalyst via spray drying. Each of these methods thus forms a "supported catalyst precursor."

The spray dried catalyst product is then preferably placed into mineral oil slurry. The viscosity of the hydrocarbon slurry diluent is sufficiently low that the slurry can be conveniently pumped through the pre-activation apparatus and eventually into the polymerization reactor. Preferably the diluent is a mineral oil having a viscosity of at least 1000 cP (1 Pa·s), preferably at least 1500 cP (1.5 Pa·s) as measured by a Brookfield viscometer at a shear rate of 1 sec$^{-1}$ at 25° C., results in reduced catalyst settling or deposit from the slurry, especially after activation. The catalyst is fed using a slurry catalyst feeder. A progressive cavity pump such as a Moyno pump is typically used in commercial reaction systems while a dual piston syringe pump is typically used in pilot scale reaction systems, where the catalyst flows are less than or equal to 10 cm$^3$/hr ($2.8 \times 10^{-6}$ mm$^3$/s) of slurry.

Prior to its introduction into the reactor, the catalyst precursor is preferably contacted with a Lewis acid activator. The Lewis acid activator used is preferably tri-n-hexyl aluminum.

In a preferred embodiment of the invention, the final addition of activator occurs within 30 minutes and preferably within less than 15 minutes of injection of the catalyst slurry to the reactor followed by thorough mixing and continuous plug-flow of the catalyst mixture thereafter to produce a homogeneous activated catalyst mixture. Use of the in-line plug-flow introduction of activated or partially activated catalyst precursor into a reactor, especially a continuous, gas-phase polymerization reactor operating under olefin polymerization conditions, results in improved uniform catalyst properties and polymerization activity, especially reduced fines, in particular a reduction in the level of fines particles of less than 125 µm in particle size as fully described in U.S. Provisional Applications 60/469,663 and 60/469,665, both filed May 12, 2003 and applications claiming those applications as priority documents.

A cocatalyst activator is also fed to the reactor to effect the polymerization. Complete activation by additional cocatalyst is required to achieve full activity. The complete activation normally occurs in the polymerization reactor although the techniques taught in EP 1 200 483 may also be used.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Conventionally, the cocatalysts are selected from the group comprising Al-trialkyls, Al-alkyl halides, Al-alkoxides and Al-alkoxy halides. In particular, Al-Alkyls and Al-chlorides are used. These compounds are exemplified by trimethyl aluminum, triethyl aluminum, tri-isobutyl aluminum, tri-n-hexyl aluminum, dimethyl aluminum chloride, diethyl aluminum chloride, ethyl aluminum dichloride and diisobutyl aluminum chloride, isobutylaluminum dichloride and the like. Butyl lithium and dibutyl magnesium are examples of useful compounds of other metals.

Polymerization

In the preferred dual reactor configuration of the process of the present invention, the catalyst precursor and cocatalyst are introduced in the first reactor, and the polymerizing mixture is transferred to the second reactor for further polymerization. Insofar as the catalyst system is concerned, only cocatalyst, if desired, is added to the second reactor from an outside source. Optionally the catalyst precursor may be partially activated prior to the addition to the reactor, followed by further in reactor activation by the cocatalyst.

The polymerization in each reactor is conducted in the gas phase using a continuous fluidized bed process. In a typical fluidized bed reactor the bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, that is, comonomers and, if desired, modifiers and/or an inert carrier gas.

The basic parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate. A typical fluidized bed reactor is further described in U.S. Pat. No. 4,482,687.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated catalyst precursor is preferably injected into the fluidized bed as a mineral oil slurry. Activation is generally completed in the reactors by the cocatalyst. The product composition can be varied by changing the molar ratios of the monomers introduced into the fluidized bed. The product is continuously discharged in granular or particulate form from the reactor as the bed level builds up with polymerization. The production rate is controlled by adjusting the catalyst feed rate and/or the ethylene partial pressures in both reactors.

A preferred mode is to take batch quantities of product from the first reactor, and transfer these to the second reactor using the differential pressure generated by the recycle gas compression system. A system similar to that described in U.S. Pat. No. 4,621,952 is particularly useful.

The pressure is about the same in both the first and second reactors. Depending on the specific method used to transfer the mixture of polymer and contained catalyst from the first reactor to the second reactor, the second reactor pressure may be either higher than or somewhat lower than that of the first. If the second reactor pressure is lower, this pressure differential can be used to facilitate transfer of the polymer catalyst mixture from Reactor 1 to Reactor 2. If the second reactor pressure is higher, the differential pressure across the cycle gas compressor may be used as the motive force to move polymer. The pressure, that is, the total pressure in the reactor, can be in the range of about 200 to about 500 psig (pounds per square inch gauge) (1380 to 3450 kPa gauge) and is preferably in the range of about 280 to about 450 psig (1930 to 3100 kPa gauge). The ethylene partial pressure in the first reactor can be in the range of about 10 to about 150 psig (70 to 1030 kPa gauge), and is preferably in the range of about 20 to about 80 psig (140 to 550 kPa gauge). The ethylene partial pressure in the second reactor is set according to the amount of copolymer it is desired to produce in this reactor to achieve the split mentioned above. It is noted that increasing the ethylene partial pressure in the first reactor leads to an increase in ethylene partial pressure in the second reactor. The balance of the total pressure is provided by alpha-olefin other than ethylene and an inert gas such as nitrogen. Other inert hydrocarbons, such as an induced condensing agent for instance, isopentane or hexane also contribute to the overall pressure in the reactor according to their vapor pressure under the temperature and pressure experienced in the reactor.

The hydrogen:ethylene mole ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

The residence time of the mixture of reactants including gaseous and liquid reactants, catalyst, and resin in each fluidized bed can be in the range of about 1 to about 12 hours (3,600 to about 43,200 s) and is preferably in the range of about 1.5 to about 5 hours (5,400 to about 18,000 s).

The reactors can be run in the condensing mode, if desired. The condensing mode is described in U.S. Pat. Nos. 4,543,399; 4,588,790; and 5,352,749.

In the most preferred dual reactor configuration, a relatively low melt flow index (or high molecular weight) copolymer is usually prepared in the first reactor. Alternatively, the low molecular weight copolymer can be prepared in the first reactor and the high molecular weight copolymer can be prepared in the second reactor. For purposes of the present disclosure, the reactor in which the conditions are conducive to making a high molecular weight polymer is known as the "high molecular weight reactor." Alternatively, the reactor in which the conditions are conducive to making a low molecular weight polymer is known as the "low molecular weight reactor." Irrespective of which component is made first, the mixture of polymer and an active catalyst is preferably transferred from the first reactor to the second reactor via an interconnecting device using nitrogen or second reactor recycle gas as a transfer medium. Additional reactors in series are optionally used to make further modifications to improve the product processability, dart impact, or bubble stability. In configurations where there are more than 2 reactors, the reactor referred to as the high molecular weight reactor is that in which the highest molecular weight polymer is prepared and, the low molecular weight reactor is the one where the lowest molecular weight polymer is prepared. The use of more than 2 reactors is useful to add small amounts, for instance about 1 to 10 percent of polymer, of a molecular weight intermediate to the molecular weights made in the other two reactors.

In the High Molecular Weight Reactor:

The mole ratio of alpha-olefin to ethylene in this reactor is advantageously in the range of from about 0.01:1 to about 0.8:1, and is preferably in the range of from about 0.02:1 to about 0.35:1.

The mole ratio of hydrogen (if used) to ethylene in this reactor can be in the range of from about 0.001:1 to about 0.3:1, preferably of from about 0.01 to about 0.2:1.

Preferred operating temperatures vary depending on the density desired, that is, lower temperatures for lower densities and higher temperatures for higher densities. Operating temperature advantageously varies from about 70° C. to about 110° C.

The melt flow index, $I_{21}$, of the high molecular weight polymer component made in this reactor is advantageously in the range of from about 0.01 to about 50, preferably of from about 0.2 to about 12, more preferably from about 0.2 to about 0.4 grams per 10 minutes The melt flow ratio, $I_{21}/I_5$ of the polymer is advantageously in at least about 6, preferably at least about 7, up to preferably about 15, more preferably up to about 12.

The molecular weight, Mw (as measured by Gel Permeation Chromatography) of this polymer is advantageously in the range of from about 135,000 to about 445,000.

The density of the polymer is advantageously at least 0.860 gram per cubic centimeter, and is preferably in the range of from about 0.890 to about 0.940 more preferably in the range of from about 0.920 to about 0.930 gram per cubic centimeter.

In the Low Molecular Weight reactor:

The mole ratio of alpha-olefin to ethylene is less than is used in the high molecular weight reactor and advantageously at least about 0.0005:1, preferably at least about 0.001:1 and advantageously less than or equal to about 0.6:1, more advantageously less than or equal to about 0.42:1, preferably less than or equal to about 0.01:1, more preferably less than or equal to about 0.007:1, most preferably less than or equal to about 0.0042:1. At least some alpha olefin accompanies the high molecular weight reactor contents.

The mole ratio of hydrogen (optional) to ethylene can be in the range of from about 0.01:1 to about 3:1, and is preferably in the range of from about 0.5:1 to about 2.2:1.

The operating temperature is generally in the range of from about 70° C. to about 110° C. The operating temperature is preferably varied with the desired density to avoid product stickiness in the reactor.

The melt flow index, $I_2$, of the low molecular weight polymer component made in this reactor is in the range of from about 0.5 to about 3000, preferably of from about 1 to about 1000 grams per 10 minutes.

The melt flow ratio, $I_{21}/I_5$, of this polymer can be in the range of from about 5 to about 15, preferably of from about 6 to about 12.

The molecular weight, Mw (as measured by Gel Permeation Chromatography (GPC)) of this polymer is, generally, in the range of from about 15,800 to about 35,000.

The density of this polymer is at least 0.900 gram per cubic centimeter, and is preferably in the range of from about 0.910 to about 0.975 gram per cubic centimeter and most preferably in the 0.970 to 0.975 gram per cubic centimeter range.

Final Product

The weight ratio of copolymer prepared in the high molecular weight reactor to copolymer prepared in the low molecular weight reactor can be in the range of about 30:70 to about 70:30, and is preferably in the range of about 40:60 to about 60:40. This is also known as the split.

The density of the blend can be at least 0.940 gram per cubic centimeter, and is preferably in the range of from about 0.945 to about 0.955 gram per cubic centimeter.

The blend or final product, as removed from the second reactor, can have a melt flow index, $I_5$, in the range of from about 0.2 to about 1.5, preferably of from about 0.25 to about 1.0 grams per 10 minutes.

The melt flow ratio, $I_{21}/I_5$, is in the range of from about 20 to about 50, preferably of from about 24 to about 40.

The molecular weight, Mw (as measured by Gel Permeation Chromatography) of the final product is, generally, in the range of from about 90,000 to about 420,000.

The bulk density can be in the range of from about 18 to about 30 pounds per cubic foot, and is preferably greater than 22 pounds per cubic foot (288, 481, and 352 kg/m$^3$, respectively).

The blend has a broad molecular weight distribution which, as noted, can be characterized as multimodal. The broad molecular weight distribution is reflected in an Mw/Mn ratio of about 20 to about 40, preferably about 22 to about 38. (The Mw is the weight average molecular weight; Mn is the number average molecular weight also measured by GPC; and the Mw/Mn ratio can be referred to as the polydispersity index, which is a measure of the breadth of the molecular weight distribution).

Post Reactor Treatment of the Blend Composition

The improved properties of the blend of the present invention are a result of the specific compositions of the individual blend components and their relative amounts but also the result of two specific post reactor treatments to the blend, tailoring and screening.

In tailoring, the blend is lightly crosslinked using heat and a source of free radicals, preferably oxygen, as the crosslinking agent. Oxygen tailoring is advantageously controlled by oxygen concentration, for instance, in a mixer/extruder, type and concentration of anti-oxidants, particularly hindered phenol, and polymer melt temperature, among other variables known to those skilled in the art. Oxygen gas, commonly with nitrogen, is advantageously introduced in a stage of the pelletization process under controlled temperatures of the molten polymer, at residence times commensurate with normal production rates of 30,000 to 55,000 pounds per hour (3.8 to 6.9 kg/s). Levels of $O_2$ from 0.05 volume percent to 6 volume percent and melt temperatures, advantageously from about 220 to 270° C., preferably from about 230 to 260° C., are conveniently employed. Such additives as octadecyl 3,5-ditert-butyl-4-hydroxyhydrocinnamate, or preferably pentaerythritol tetrakis (3-(3',5'-di-tert-butyl-4'-hydroxyphenyl) commercially available from Ciba Specialty Chemicals under the trade designations Irganox 1076 and 1010, respectively, and zinc stearate and/or calcium stearate neutralizers, advantageously both in about a 1:2 ratio, are added to the resin before exposure to the oxygen.

FIG. 1 illustrates the preferred extruder configuration for tailoring. The illustrated extruder mixer portion includes a hopper section 10 and a vent section 20 separated by a gate 30. A mixing screw 40 goes through the hopper section, the gate, and the vent section. The hopper section has a mixer feed hopper 50 which receives feed 100 including polymer and additives such as antioxidants (A/O) 110. The feed and additives are pushed through the hopper section and the gate by the mixing screw, which goes through the gate into the vent section. The vent section includes a vent 60 having a removable vent plug 70 illustrated in the vent and an exit portal 80 leading to the gear pump leading to screening and the extrusion die.

In the illustrated embodiment, tailoring includes feeding base resin with a phenolic antioxidant and mixed stearate additives preferably zinc and calcium stearate in a 1:2 ratio by weight in the mixer hopper. The oxygen and temperature levels are controlled in the second mixing (vent) section to achieve the desired light crosslinking (tailoring). Phosphite additives are not used in this example and are preferably avoided because they stabilize free radicals in the melt thus inhibiting the tailoring process. In this configuration, oxygen is injected into the mixer's vent section via one (or more) injection nozzles located in the vent plug. Further, no oxygen is deliberately added to the mixer's feed hopper or feed throat nor is there oxygen flow between the hopper and vent sections. In this embodiment, a minimum of 100 lb/hr (45 kg/hr, 0.013 kg/s) of gas injection is required to ensure the vent section is completely saturated with an effective oxygen concentration and to prevent atmospheric air from being drawn into the mixer's vent section when the polymer flow is 30,000 lb/hr (3.8 kg/s); thus, the oxygen concentration is supplied at a rate of about 0.3 weight percent.

Polymer melt temperature is directly related to the specific energy input ("SEI"), a measure of how much energy per unit mass is imparted to the resin. In continuous mixers and twin screw extruders, SEI can be controlled by mixer speed (typically high and low), throughput rate, gate position and gear pump suction pressure. In a preferred embodiment the gate is a back pressure adjustment device (that is, a throttle valve) that controls the residence time and specific energy input into the polymer. Controlling SEI is within the skill in the art. A more detailed description of this technique is disclosed in U.S. Pat. Nos. 5,728,335 and 6,454,976 B1. Resin temperature control is accomplished in the illustrated embodiment using an averaged calculated polymer temperature provided by a control system and by manipulation of the mixer gate device. Opening the gate reduces calculated polymer temperature. Increasing melt pump suction pressure increases calculated polymer temperature. Preferably however, melt pump suction pressure is held constant. In the illustrated embodiment, granular polymer becomes molten in the hopper section of the illustrated extruder portion primarily from the screw action although heat along the barrel is optionally supplied.

Tailoring of the resultant blend results in increased film bubble stability over the stability of the blend before tailoring. Advantageously, sufficient tailoring results in sufficient bubble stability to make films down to 6 microns ($6 \times 10^{-6}$ m) at commercial actual output rates, for instance up to about 30 pounds per hour per inch (0.00015 kg/s/mm) of die circumference on high speed film lines. This measurement is obtained by measuring the output rate in mass per unit of time and dividing the circumference of the die into the output rate measurement.

There are very few measurable changes to the final product as a result of tailoring. The polymer is not crosslinked in an amount measurable by such tests as gel content, nor do the bulk properties like melt index change appreciably, partly because the test method is not accurate enough to detect the small changes. The melt flow ratio ($I_{21}/I_5$) generally increases by 1 to 4 units. One way to monitor the tailoring process is by actually blowing film on a grooved barrel extruder (for instance an HDPE Blown Film line made by Alpine) and measuring the bubble stability and dart impact. Desirable final properties are line speeds in excess of 240 fpm (feet per minute) (1.22 m/s) (giving about 0.3 mil ($7.6 \times 10^{-6}$ m) film) with dart impact of more than 300 grams for 0.5 mil ($1.3 \times 10^{-5}$ m) film. Higher line speeds and lower dart impacts generally mean the resin has been overtailored. Further, if the resin is severely over-tailored, crosslinked gels may be formed and may increase gel concentrations and sizes to unacceptable levels. Lower line speeds generally indicate undertailoring (insufficient light crosslinking to impart desired bubble stability). Higher bubble stability is favored in the market.

The blends of the invention are advantageously also melt screened. Subsequent to the tailoring process the molten blend is passed through one or more active screens (positioned in series of more than one) with each active screen having a micron retention size of from about 2 to about 70 (2 to $7 \times 10^{-6}$ m), at a mass flux of about 5 to about 100 lb/hr/in$^2$ (1.0 to about 20 kg/s/m$^2$). Screening is within the skill in the art. A more detailed description of this technique is disclosed in U.S. Pat. No. 6,485,662 B1

The blends of the present invention advantageously exhibit improved extrusion processing as shown by an improvement in extruder screw differential amperage of at least about 12, preferably at least about 15 and more preferably at least about 18 percent relative to the extrusion, under similar conditions, of an analogous multimodal resin of the same final molecular weight and density but prepared such that there is greater than about 0.007 mole percent alpha olefin comonomer in the low molecular weight reactor.

As a standard of comparison, films are prepared on an HS50S stationary extrusion system with a BF 10-25 die, HK 300 air ring, A8 take off, and WS8 surface winder, all commercially available from Hosowaka Alpine Corporation, with a 100 mm die diameter having a 50 mm 21:1 L/D grooved feed extruder used according to the conditions described hereinafter. Bubble stability is preferably determined at a desirable film thickness of 6 microns (micrometers) ($6 \times 10^{-6}$ m) because this thickness is commercially desirable and difficult to maintain with good bubble stability. For instance, a film having a given line speed, actual or specific output rate at $6 \times 10^{-6}$ m thick is considered about twice as stable as a film twice as thick, 0.5 mil ($1.3 \times 10^{-5}$ m), having the same line speed, actual or specific output rate.

Films, when fabricated from the blends of the present invention at about 6 microns ($6 \times 10^{-6}$ m) film thickness have a bubble stability of greater than about 240, preferably greater than about 250, most preferably greater than about 260 ft/min (1.22, 1.27, 1.32 m/s, respectively) line speed.

Films, when fabricated from the blends of the present can be produced at a thickness of 6 microns ($6 \times 10^{-6}$ m) at an actual output rate of at least about 50 lb/hr (0.0063 kg/s), preferably at least about 75 (0.0094 kg/s), more preferably at least about 100 lb/hr (0.013 kg/s) and generally from about 50 to about 1100, preferably from about 75 to about 1050, more preferably from about 100 to about 1000 lb/hr (23 to 499, 34 to 476, 45 to 454 kg/hr or 0.0063 to 0.14, 0.0094 to 0.13, and 0.013 to 0.13 kg/s, respectively).

Films, when fabricated from the blends of the present invention can be produced at a thickness of 6 microns ($6 \times 10^{-6}$ m) at a specific output rate of at least about 0.5 lb/hr/rpm (0.0000011 kg/s/rps), preferably at least about 0.8 lb/hr/rpm (0.0000017 kg/s/rps), and more preferably at least about 1.0 lb/hr/rpm (0.0000021), advantageously from about 0.5 to about 15, preferably from about 0.8 to about 13, more preferably from about 1.0 to about 12 lb/hr/rpm, (0.0000011 to 0.000031, 0.0000017 to 0.000027, and 0.0000021 to 0.000025 kg/s/rps respectively). The films also have a dart impact of advantageously greater than about 300, more advantageously greater than about 400 g, preferably greater than about 420 g, more preferably greater than about 440 g, (at a thickness of 0.5 mil ($1.3 \times 10^{-5}$ m)).

The films also have a film appearance rating (FAR) of greater than or equal to 20, preferably greater than or equal to 30, more preferably greater than or equal to 40 (at a thickness of 1.0 mil ($2.5 \times 10^{-5}$ m)). Film appearance rating is a visual measure of the gels in the product based on a comparison to film standards further described hereinafter.

The invention includes fabricated articles made from the novel blends described herein, optionally prepared using any processing technique suitable for use with polyolefins within the skill in the art. Useful articles include, in addition to films, fibers having at least one blend of the invention as at least one component of the fiber's structure (for instance, staple fibers, spunbond fibers, melt blown fibers, and spun fibers), such fibers used in woven, knit, and nonwoven fabrics, or structures made from such fibers such as blends of these fibers with other fibers such as polyester or cotton. Exemplary of the fiber processes and products in which the blends are useful are those disclosed in U.S. Pat. Nos. 4,430,563; 4,633,220; 4,668,566; 4,322,027; 4,413,110; and 3,485,706. The blends are particularly useful for molded articles (for instance made using an injection molding process, a blow molding process or a rotomolding process or a combination thereof) as well as for sheet extrusion for vacuum forming and thermoforming sheets. Molded fabricated articles include conduits, especially electrical conduits, tapes, especially stretch tapes, sheets, pipes and the like. The blends described herein are also useful for wire and cable jacketing, optionally with other materials.

The blends are particularly suitable for making hollow structures such as conduit and pipe, especially corrugated pipe, in either single layer or multilayer structures, having circular, polygonal such as square, optionally with rounded corners or other cross sections. Some multilayer structures are formed with at least one structural network between layers. The corrugation in corrugated pipe (or by analogy other shaping which enhances strength or other desirable qualities) is frequently formed by vacuum molding or, alternatively, by blow molding or continuous blow molding. Multilayer structures advantageously include at least one outer corrugated layer and at least one inner smooth layer. The inner and outer layers are advantageously fused together at least at the root (base of the trough) of the corrugation. Many other structures, including those profiles extruded with smooth inner and outer layers tied together by structural trusses are within the practice of the invention. Myriad structural design and fabrication choices are well within the skill in the art., for instance those disclosed in one or more of the following U.S. Pat. Nos. 4,365,948; 4,545,751; 3,981,663; 5,296,188; 4,969,670, and 6,199,592. Superior properties of blends described herein permit fabricating large structures such as those sufficiently tall to permit humans to stand inside, for instance having a height of at least about 1.8 m, preferably at least about 2.4 m.

The novel olefin polymer blends are particularly useful for corrugated pipe and other applications where the relationship between density and stiffness, density and slow crack growth resistance, and processability facilitate production of finished products with a superior balance of properties. Stiffness is indicated by flexural modulus measured by the procedures of ASTM D-790. Within the art, stiffness is considered obtainable by raising the density of an ethylene polymer. Blends described herein, however, have higher stiffness at lower densities than commonly observed. The ratio of flexural modulus to density is at least about 165000, preferably at least about 175,000, more preferably at least about 185,000 and most preferably at least about 195,000 psi·cc/g (1140, 1210, 1280, 1340 kPa·m$^3$/kg, respectively). This stiffness permits use of thinner structures (downgaging), for instance pipe walls, to achieve at least the same mechanical properties appropriate for each application, such as at least one of crush strength, yield strength, tensile strength, crack resistance, tear resistance, or modulus. The excellent slow crack growth resistance of the blends described herein is useful for long term viability of a fabricated article, especially a thinner article. Slow crack growth is measured by Notched Constant Ligament Stress (NCLS), measured according to the procedures of ASTM F-2136, which measures the number of hours until a crack is propagated into a failure or complete break. The NCLS is advantageously sufficient to avoid propagation of cracks in the fabricated articles under normal conditions of use. AASHTO (American Association of State Highway Transportation Officials) specification M294 entitled "Corrugated Polyethylene Pipe, 300 to 1200 mm Diameter" requires that the pipe have an NCLS testing value greater than 24 hours. Common pipe resins have NCLS specifications of about 30 hours. In contrast, blends described herein have a NCLS of at least about 2400, preferably at least about 5000, more preferably at least about 6000 hours. The combination of increased stiffness with increased resistance to slow crack growth properties while maintaining excellent processability represents an unexpectedly significant change in the performance of polymers used in a fabricated article such as corrugated pipe and provides an improved cost/performance property combination. Processability is indicated by the ratio of $I_{21}$ to $I_2$ ($MI_{21}/MI_2$ or $I_{21}/I_2$), which is advantageously at least about 90, preferably at least about 100, more preferably at least about 150 and usually less than about 200.

The light crosslinking introduced by tailoring is conveniently measured as long chain branching in the compositions of the invention. The association between tailoring or light crosslinking and long chain branching is known within the art, for instance as expressed in U.S. Pat. Nos. 6,420,298; 6,706,822; PCT Applications 0116192 (2001), 03037941 (2003), 03047839 (2003), and 04005357 (2004) and U.S. Published application 20040039131. Long chain branching is defined herein as a chain length of at least 6 carbons, above which the length cannot be distinguished using $^{13}$C nuclear magnetic resonance spectroscopy. The presence of long chain branching can be determined in ethylene homopolymers by using $^{13}$C nuclear magnetic resonance (NMR) spectroscopy and is quantified using the method described by Randall (*Rev. Macromol. Chem. Phys.*, C29, V. 2&3, p. 285-297). Although conventional 13C nuclear magnetic resonance spectroscopy cannot determine the length of a long chain branch in excess of six carbon atoms, there are other known techniques useful for determining the presence of long chain branches in ethylene polymers, including ethylene/1-octene interpolymers.

Two such methods are gel permeation chromatography coupled with a low angle laser light scattering detector (GPC-LALIS) and gel permeation chromatography coupled with a differential viscometer detector (GPC-DV). The use of these techniques for long chain branch detection and the underlying theories have been well documented in the literature. See, e.g., Zimm, G. H. and Stoclanayer, W. H., *J Chem. Phys.*, 17, 1301 (1949) and Rudin, A., *Modern Methods of Polymer Characterization*, John Wiley & Sons, New York (1991) pp. 103-112. A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in other ethylene polymers. In particular, deGroot and Chum showed that GPC-DV may be used to quantify the level of long chain branches in ethylene/octene copolymers. These techniques measure as little as 0.01 long chain branches per 1000 carbon atoms. While the amount of long chain branching introduced by tailoring is small, it is usually at least this measurable limit and is usually less than about 0.1 long chain branches per 1000 carbon atoms.

Objects and advantages of this invention are further illustrated by the following examples. The particular materials and amounts thereof, as well as other conditions and details, recited in these examples should not be used to limit this invention. Unless stated otherwise all percentages, parts and ratios are by weight.

EXAMPLES

Test Methods

Polymer Fines Measurement

The amount of polymer fines in a given sample is determined using the following method: 500 grams of polymer are added to a standard sieve set consisting of the following US mesh sizes: 0, 18, 35, 60, 120, 200 ($2.00 \times 10^{-3}$ m, $1.00 \times 10^{-3}$ m, $500 \times 10^{-6}$ m, $250 \times 10^{-6}$, $125 \times 10^{-6}$ m, $75 \times 10^{-6}$ m) and pan. A Rotap or Gradex 2000 shaker is used to separate the particles. The materials passing through the 120 mesh screen and on the pan are classified as fines. The geometric mean is used to calculate the particle average particle size.

Polymer Density

Polymer density is measured using ASTM Method D-1505.

Dart Impact

Dart Impact testing is done according to ASTM D 1709, Method A and measured at 0.5 mil ($1.3 \times 10^{-5}$ m) film thickness Film Appearance Rating (FAR).

A FAR value is obtained by comparing the extruded film to a set of reference film standards both at 1.0 mil thickness. The standards are available from The Dow Chemical Company (citing Test Method PEG #510 FAR). The resin is stabilized prior to extrusion by thoroughly mixing 0.08, 0.10 and 0.05 weight percent respectively of the following additives into the resin: A phenolic stabilizer, octadecyl 3,5-di-tert-butyl-4-hydroxyhydrocinnamate commercially available from Ciba Specialty Chemicals under the trade designation Irganox 1076, calcium stearate, and zinc stearate. The extruder used is a Model CE-150-20, 38 mm (1½") 20:1 L/D, MPM Custom Equipment electrically heated air cooled extruder with 7 heating zones (3 barrel, 1 gate, 3 die). A more detailed description is:

| | |
|---|---|
| Extruder | Manufacturer: MPM Polymer Systems, Inc. |
| | Type: Low Boy [610 mm (24 inch) Center Line] |
| | Heating: Electrical 425° C. controllers |
| | Cooling: Only on hopper (water) |
| | Speed: Variable |
| Screw | Manufacturer: MPM Polymer Systems, Inc. |
| | Type: 20:1 standard low density polyethylene screw bored to midway of transition section. |
| | Diameter: 38 mm (1.5 inches) |
| | L to D: 20/1 |
| Die Manufacturer: | MPM Polymer Systems, Inc. |
| | Diameter: 100 mm (4 inches) |
| | Gap: 30 mil (0.762 mm) |
| | Type: Deep Side Fed |
| Blower | Manufacturer: Buffalo Forge |
| | Air flow control damper on suction |
| | Air flow control valving on discharge |
| | Motor: 1.5 hp (1120 W), 2 speeds |
| | Air equalizing chamber between blower and air |
| Air Ring | Manufacturer: MPM Polymer Systems, Inc. |
| | Layout 708 |
| | Diameter: 172 mm (6.75 inch) I.D. |
| | Type: Adjustable lip |
| Tower | Height: 914 mm (36 inches) |
| Collapsing Frame | Length: 343 mm (13.5 inches) |

The extrusion conditions for the FAR test are as follows:

| | |
|---|---|
| Screw | Neutral |
| Hopper Water Temperatures (° C.) | Full Flow |
| Zone 1 | 210 |
| Zone 2 | 210 |
| Zone 3 | 210 |
| Gate | 225 |
| Adapter | 225 |
| Die Zone 1 | 225 |
| Die Zone 2 | 225 |

| Output: | |
|---|---|
| Screw Speed | 65 rpm |
| Blow up Ratio | 2/1 |
| Lay flat, inches | 12 (304.8 mm) |
| Frost Line Heights, inches | 103 (254 mm) |
| Tower Height, inches | 36 (914.4 mm) |
| Film Rating Test | |
| Nip Roll Speed, fpm | 254 (7.62 m/min) |
| Film Gauge, mil | 1.5 (0.038 mm) |
| Range for Film Gauge, mil | 1.3-1.7 (0.033 mm) |

[1]Screw speed can be adjusted to give proper throughput rates.
[2]This is acceptable throughput for products with density of 0.948 to 0.952 g/cm³ and melt indices of 10 to 17.
[3]Frost line is measured from the lower level of the air ring.
[4]Nip roll speed is varied until a film thickness of 1.5 mil (0.038 mm) or 0.5 mil (0.013 mm) is obtained.

After the extruder has reached thermal equilibrium and uniform film is being produced, a sample of 3 meters long of the film is taken. Ratings are based upon the worst section viewed in each sample. This rating is based on the level of gels observed in the film, a general term for a discrete imperfection in polyethylene film. Gel may be formed from high molecular weight material, either clear or discolored, lint or other foreign contamination, or resin cross contamination. Gels are the most common defect encountered in films, and account for a large portion of the Film Rating. Other defects are noted but normally are not included in the film appearance value. If needed, reference is made to a set of high density film standards during this evaluation. The values given are in increments of 10 units ranging from +50 (best) to −50 (worst).

Bubble Stability

The bubble stability is measured as the speed of the film line just prior to failure in ft/min (m/s). A faster film line speed prior to failure indicates higher bubble stability. Failure of bubble stability is defined as the inability to control the bubble and form film with excellent gauge (thickness) uniformity. Bubble stability is measured on the following blown film line commercially available from Hosokawa Alpine Corporation under the following conditions:

| Extruder profile | | |
|---|---|---|
| Barrel Zone 1 | 390° F. | (199° C.) |
| Barrel Zone 2 | 400° F. | (204° C.) |
| Adapter Bottom | 400° F. | (204° C.) |
| Adapter Vertical | 410° F. | (210° C.) |
| Bottom Die | 410° F. | (210° C.) |
| Middle Die | 410° F. | (210° C.) |
| Top Die | 410° F. | (210° C.) |
| Output Rate | 100 lb/hr | (0.012 kg/s) |
| Blow up ratio (BUR) | 4:1 | |
| Neck height | 32 inch | (0.81 m) |
| Frost line height | 42 inch | (1.07 m) |
| Melt temperature | 410° F. | (210° C.) |
| Lay Flat Width | 25.25 inch | (0.64 m) |
| Film Thickness | 0.5 mils | $(1.27 \times 10^{-5}$ m) |

Blown Film Equipment Description
Alpine HS50S stationary extrusion system
  50 mm 21:1 L/D grooved feed extruder
  60 HP (44742 W) DC drive
  Extruder has a cylindrical screen changer
  standard control panel with 9 RKC temperature controllers
Alpine Die BF 10-25
  12 spiral design
  complete with insert to make up a 100 mm die diameter
Alpine Air Ring HK 300
  single lip design
  air lips for a 100 mm die diameter
  7.5 HP (5593 W) blower with variable speed AC drive
Bubble calibration Iris Model KI 10-65
  layflat width (LFW) range 7 to 39 inch (0.178 to 0.991 m)
Alpine Take-Off Model A8
  collapsing frame with side guides with hard wood slats
  maximum LFW: 31 inch (0.787 m)
  roller face width: 35 inch (0.889 m)
  maximum takeoff speed: 500 fpm (2.54 m/s)
  4 idler rolls
Alpine surface winder Model WS8
  maximum LFW: 31 inch (0.787 m)
  roller face width: 35 inch (0.889 m)
  maximum line speed: 500 fpm (2.54 m/s)
  automatic cutover Unless stated otherwise gravimetric feed is used. Blowing and winding are begun and established at an output rate of 100 lb/hr (0.012 kg/s) and winding at 82.5 ft/min (0.42 m/s) with a neck height of 32.0 inches (0.81 m) with a lay flat value of 24.5 inches (0.622 m) with a symmetrical bubble producing a film about 1.0 mil ($2.5 \times 10^{-5}$ m) thick. These conditions are maintained for at least 20 minutes (1200 s) after which a 10 ft (3.05 m) sample is collected for rating the FAR as previously described. Then the haul-off speed is increased to 165 ft/min (0.84 m/s) such that the film thickness decreases to 0.5 mil ($1.3 \times 10^{-5}$ m) for at least 8 dart impact measurement samples. Both the neck height and lay flat width are maintained. The sample is taken after at least 3 minutes (180 s) with a clean die lip to avoid scratches. To avoid aging effects, dart impact is measured within 1 hour (3600 s) after the samples are taken using the procedure of ASTM D 1709, Method A, staircase-testing technique with the dart dropped around the circumference of the sample.

Continuing the conditions of 100 lb/hr (0.012 kg/s) output rate, 165 ft/min (0.84 m/s) haul-off speed, 32.0 inch (0.81 m) neck height, and 24.5 inch (0.622 m) lay-flat, 0.5 mil film thickness ($1.3 \times 10^{-5}$ m), the bubble blown in the process is visually observed for helical instability or bubble diameter oscillation. The number of amps required for the extruder and the extruder pressure are recorded, if desired. A bubble is considered stable as long as neither of these conditions is observed even though some bubble chatter may be observed. Helical instability involves decreases in diameter in a helical pattern around the bubble. Bubble diameter oscillation involves alternating larger and smaller diameters. Vertical Bubble Stability is also examined. A constant extruder output rate of 100 lb/hr (0.012 kg/s) is maintained while the haul-off speed is increased to decrease the film thickness until the bubble becomes unstable or neck height oscillation or increase and decrease of neck height is observed. The haul-off speed is increased in about 10 ft/min (0.05 m/s) increments while the air ring blower setting is adjusted to maintain the neck height until vertical oscillation is observed. The haul-off speed where oscillation of amplitude greater than 4 inches (0.1 m) is recorded as the vertical bubble stability value.

Preparation of Catalyst Precursor

A typical catalyst precursor preparation is as follows although one skilled in the art could readily vary the amounts employed depending on the amount of polymer required to be made.

The titanium trichloride catalyst component is prepared in a 1900 liter vessel equipped with pressure and temperature control, and a turbine agitator. A nitrogen atmosphere (less than 5 ppm (parts by weight per million) $H_2O$) is maintained at all times.

Fourteen hundred eighty liters (1480 l) of anhydrous tetrahydrofuran (less than 40 ppm $H_2O$) are added to the vessel. The tetrahydrofuran is heated to a temperature of 50° C., and 1.7 kg of granular magnesium metal (70.9 g atoms) are added, followed by 27.2 kg of titanium tetrachloride (137 mol). The magnesium metal has a particle size in the range of from 0.1 mm to 4 mm. The titanium tetrachloride is added over a period of about one-half hour.

The mixture is continuously agitated. The exotherm resulting from the addition of titanium tetrachloride causes the temperature of the mixture to rise to approximately 72° C. over a period of about three hours. The temperature is held at about 70° C. by heating for approximately another four hours. At the end of this time, 61.7 kg of magnesium dichloride (540 moles) are added and heating is continued at 70° C. for another eight hours. The mixture is then filtered through a 100 micron ($100 \times 10^{-6}$ m) filter to remove undissolved magnesium dichloride and any unreacted magnesium (less than 0.5 percent).

One hundred kilograms (100 kg) of fumed silica (CAB-O-SIL.RTM. TS-610, manufactured by the Cabot Corporation) are added to the precursor solution over a period of about two hours. The mixture is stirred by means of a turbine agitator during this time and for several hours thereafter to thoroughly disperse the silica in the solution. The temperature of the mixture is held at 70° C. throughout this period and a dry nitrogen atmosphere is maintained at all times.

The resulting slurry is spray dried using an 8 foot (2.4 m) diameter closed cycle spray dryer equipped with a Niro FS-15 rotary atomizer. The rotary atomizer is adjusted to give catalyst particles with a D50 on the order of 20 to 30 microns (20 to 30×10⁻⁶ m). D50 is controlled by adjusting the speed of the rotary atomizer. The scrubber section of the spray dryer is maintained at approximately −5° C.

Nitrogen gas is introduced into the spray dryer at an inlet temperature of 140 to 165° C. and is circulated at a rate of approximately 1700 to 1800 kg/hr (0.47 to 0.5 kg/s). The catalyst slurry is fed to the spray dryer at a temperature of about 35° C. and a rate of 65 to 100 kg/hr (0.018 to 0.028 kg/s), or sufficient to yield an outlet gas temperature in the range of 100 to 125° C. The atomization pressure is slightly above atmospheric.

The discrete catalyst precursor particles are then mixed with mineral oil under a nitrogen atmosphere in a 400 liter vessel equipped with a turbine agitator to form a slurry containing approximately 28 weight percent of the solid catalyst precursor.

Polymerization

The catalyst precursor slurry, the triethylaluminum cocatalyst, ethylene, alpha-olefin, and, optionally, hydrogen are continuously fed into the first reactor; the polymer/active catalyst mixture is continuously transferred from the first reactor to the second reactor; ethylene and, optionally, alpha-olefin and hydrogen, and cocatalyst are continuously fed to the second reactor. The final product is continuously removed from the second reactor.

Example 1 and Comparative Example B

The exact preparation conditions for Example 1 and Comparative Example B are summarized in Table 1.

TABLE 1

Preparation Conditions for Example 1 and Comparative Example B

| Reactor Conditions | Example I R1 | Example I R2 (final blend A) | Comparative Example B R1 | Comparative Example B R2 (final blend B) |
|---|---|---|---|---|
| Temperature (° C.) | 75 | 110 | 80 | 110 |
| Pressure (psig) | 298 | 418 | 290 | 423 |
| Pressure (kPa gage) | 2055 | 2882 | 1999 | 2916 |
| $C_2$ PP (psi) | 38.1 | 97.7 | 41 | 95 |
| $C_2$ PP (kPa) | 263 | 674 | 283 | 655 |
| $H_2/C_2$ | 0.025 | 1.8 | 0.0291 | 1.8 |
| $C_6/C_2$ | 0.074 | 0.003 | 0.0408 | 0.0103 |
| $N_2$ % | 75.3 | 30.6 | 73.4 | 29 |
| $H_2$ % | 0.309 | 40.7 | 0.4 | 39.1 |
| $C_2H_4$ % | 12.2 | 22.6 | 13.4 | 21.7 |
| $C_2H_6$ % | 0.631 | 2.82 | 1.4 | 2.9 |
| $C_4H_8$ % | 0 | 0.01 | 0 | 0.0004 |
| $IC_5$ % | 9.8 | 2.84 | 10.6 | 7.1 |
| $C_6H_{12}$ % | 0.9 | 0.079 | 0.5 | 0.2 |
| TEAL Flow (lb/hr) | 7 | 3 | 5.23 | 3.79 |
| TEAL Flow (kg/s) | 8.8E−04 | 3.8E−04 | 6.6E−04 | 4.8E−04 |
| Production Rate (klb/hr) | 46.6 | 37.9 | 31 | 24 |
| Production Rate (kg/s) | 5.9 | 4.8 | 3.9 | 3.0 |
| Catalyst Feed (lb/hr) | 13.1 | | 8.4 | — |
| Catalyst Feed (kg/s) | 1.7E−03 | | 1.1E−03 | — |
| $C_2$ Feed (klb/hr) | 45.2 | 37.9 | 30 | 23.4 |
| $C_2$ Feed (kg/s) | 5.7 | 4.8 | 3.8 | 2.9 |
| $C_4$ Feed (lb/hr) | 0 | 0 | 0 | 0 |
| $C_4$ Feed (kg/s) | 0 | 0 | 0 | 0 |
| $C_6$ Feed (lb/hr) | 1410 | 0.08 | 689 | 218.4 |
| $C_6$ Feed (kg/s) | 1.8E−01 | 1.0E−05 | 8.7E−02 | 2.8E−02 |
| $H_2$ Feed (lb/hr) | 0.31 | 81.6 | 0.25 | 112 |
| $H_2$ Feed (kg/s) | 3.9E−05 | 1.0E−02 | 3.1E−05 | 1.4E−02 |
| $N_2$ Feed (lb/hr) | 687 | 45 | 418 | 1253 |
| $N_2$ Feed (kg/s) | 8.7E−02 | 5.7E−03 | 5.3E−02 | 1.6E−01 |
| $IC_5$ Feed (lb/hr) | 754 | 0 | 612 | 894 |
| $IC_5$ Feed (kg/s) | 9.5E−02 | 0.0E+00 | 7.7E−02 | 1.1E−01 |
| Vent Flow (lb/hr) | 0 | 42 | 179 | 92 |
| Vent Flow (kg/s) | 0.0E+00 | 5.3E−03 | 2.3E−02 | 1.2E−02 |
| Bed Weight (klb) | 95.1 | 189 | 106 | 172 |
| Bed Weight (kg) | 4.3E+04 | 8.6E+04 | 4.8E+04 | 7.8E+04 |
| Upper FBD (lb/ft³) | 12.2 | 17.4 | 15.5 | 17.4 |
| Upper FBD kg/m³ | 1.95E+02 | 2.79E+02 | 2.48E+02 | 2.79E+02 |
| Lower FBD (lb/ft³) | 15.1 | 19.7 | 17.2 | 19.7 |
| Lower FBD kg/m³ | 2.42E+02 | 3.16E+02 | 2.76E+02 | 3.16E+02 |
| Bed Level (ft) | 37.9 | 47.2 | 31.7 | 44.3 |
| Bed level in (m) | 1.2E+01 | 1.4E+01 | 9.7E+00 | 1.4E+01 |
| SGV (ft/s) | 1.89 | 1.95 | 1.55 | 1.8 |
| SGV (m/s) | 5.8E−01 | 5.9E−01 | 4.7E−01 | 5.5E−01 |
| Split | 55.1 | 44.9 | 56.6 | 43.4 |
| Resin Analysis* | | | | |
| Ti (ppmw) | 2.05 | 1.31 | 1.91 | 1.21 |
| Al/Ti | 83.1 | 87.5 | 61.5 | 70.7 |
| MI ($I_2$) (g/10 min) | | | — | — |
| MI ($I_5$) (g/10 min) | | 0.35 | — | 0.35 |
| MFI ($I_{21}$) (g/10 min) | 0.31 | 9.18 | 0.48 | 8.12 |

TABLE 1-continued

Preparation Conditions for Example 1 and Comparative Example B

|  | Example 1 | | Comparative Example B | |
|---|---|---|---|---|
| Reactor Conditions | R1 | R2 (final blend A) | R1 | R2 (final blend B) |
| MFR($I_{21}/I_2$) | — | — | — | — |
| MFR($I_{21}/I_5$) |  | 26.5 | — | 23.6 |
| Density (g/cm$^3$) | 0.9263 | 0.9483 | 0.9295 | 0.9482 |
| Density kg/m$^3$ | 926.3 | 948.3 | 929.5 | 948.2 |
| Bulk Dens (lb/ft$^3$) | 21.6 | 26.7 | 23.9 | 29.1 |
| Bulk Density kg/m$^3$ | 3.5E+02 | 4.3E+02 | 3.8E+02 | 4.7E+02 |
| APS (inch) | 0.03 | 0.031 | 0.025 | 0.023 |
| APS (m) | 7.6E−04 | 7.9E−04 | 6.4E−04 | 5.8E−04 |
| Fines (wt %) | 3.4 | 4.1 | 1.35 | 1.34 |

*the resin additive package is 800 ppm (0.08%) Irganox ™ 1076 (a product and trademark of Ciba Specialty Chemicals), 1000 ppm (0.1%) calcium stearate, and 500 ppm (0.05%) zinc stearate where TEAL is triethylaluminum; FDB is fluidized bulk density; SGV is superficial gas velocity; APS is average particle size; and $IC_5$ is isopentene; PP is partial pressure; E is exponent of the base 10; and % is mole percent.

Analysis of the date in Table 1, shows that the main differences in the preparation of the blend of Example 1 versus Comparative Example B is that the preparation of Example 1 utilizes a much lower hexene/ethylene mole ratio in the low molecular weight reactor, R2, than that used for the preparation of comparative Example 1 (0.003 versus 0.0103 respectively). Also, the $I_{21}$ of the high molecular weight fraction in Example 1 is much lower than that of the high molecular weight component of Comparative Example B (0.31 versus 0.48 g/10 min respectively), indicating a much higher molecular weight for the HMW component of Example 1 compared with Comparative Example B.

Example 1 and Comparative Example B are tailored and screened according to the procedure previously described using the apparatus of FIG. 1 using the conditions in Table 2.

TABLE 2

$O_2$ Tailoring and Screening Conditions

|  | Example 1 | Comp Example B |
|---|---|---|
| $O_2$ (volume percent) | 1.5 | 2.0 |
| Melt Temperature (° C.) | 260 | 260 |
| Mixer Speed, (rpm) | 220 | 290 |
| Production Rate (kg/hr) | 20,400 | 22,600 |
| Production Rate (kg/s) | 5.3 | 6.3 |

TABLE 2-continued $O_2$ Tailoring and Screening Conditions

|  | Example 1 | Comp Example B |
|---|---|---|
| Active Screen (s) size (m) | 56/45/45 × 10$^{-6}$ | 56/45/45 × 10$^{-6}$ |
| Mass Flux (lb/hr/in$^2$) | 24.5 | 27.2 |
| Mass Flux (kg/s/m$^2$) | 4.8 | 5.3 |

Lowering mixer speed from 290 to 220 rpm improves tailoring. This change results in lower and more controllable melt temperatures, provides for longer residence times and more controlled mixer flux point conditions. All these improve control of the tailoring process and enable more uniform tailoring. More uniform tailoring results in more consistent polymer properties of bubble stability and dart impact strength.

The dart impact and bubble stability are determined on the grooved barrel extruder commercially available from Hosokawa Alpine Corporation previously described and using the conditions previously described. The measure of bubble stability used is the speed of the line. The faster the speed (prior to failure) the better the bubble stability. The results are summarized in Table 3 which shows a series of measurements at two hour intervals.

TABLE 3

Dart and Bubble Stabilities

| Example 1 (Final Blend A) | | | Comparative Example B (Final Blend B) | | |
|---|---|---|---|---|---|
| Bubble Stability (ft/min) | Bubble Stability (m/s) | Dart Impact (g) | Bubble Stability (ft/min) | Bubble Stability (m/s) | Dart Impact (g) |
| 270.0 | 1.37 | 475.0 | 210 | 1.07 | 295 |
| 270.0 | 1.37 | 470.0 | 240 | 1.22 | 278 |
| 255.0 | 1.30 | 431.0 | 220 | 1.12 | 305 |
| 255.0 | 1.30 | 418.0 | 240 | 1.22 | 270 |
| 265.0 | 1.35 | 491.0 | 200 | 1.02 | 320 |
| 255.0 | 1.30 | 503.0 | 200 | 1.02 | 305 |
|  |  |  | 200 | 1.02 | 325 |
|  |  |  | 200 | 1.02 | 335 |
|  |  |  | 210 | 1.07 | 320 |
|  |  |  | 200 | 1.02 | 290 |
|  |  |  | 200 | 1.02 | 330 |

TABLE 3-continued

Dart and Bubble Stabilities

| Example 1 (Final Blend A) | | | Comparative Example B (Final Blend B) | | |
|---|---|---|---|---|---|
| Bubble Stability (ft/min) | Bubble Stability (m/s) | Dart Impact (g) | Bubble Stability (ft/min) | Bubble Stability (m/s) | Dart Impact (g) |
| | | | 200 | 1.02 | 335 |
| | | | 220 | 1.12 | 315 |
| | | | 220 | 1.12 | 380 |
| | | | 220 | 1.12 | 390 |
| | | | 220 | 1.12 | 425 |
| | | | 220 | 1.12 | 340 |
| | | | 240 | 1.22 | 330 |
| | | | 210 | 1.07 | 320 |
| | | | 210 | 1.07 | 290 |
| | | | 230 | 1.17 | 335 |
| | | | 200 | 1.02 | 275 |
| | | | 210 | 1.07 | 290 |

Analysis of the data in Table 3 shows that lowering, but not removing, the comonomer content in the low molecular weight reactor and/or increasing the molecular weight of the high molecular weight fraction results in an increase in bubble stability and an increase in dart impact.

As a further confirmation of these, the extrusion behavior of the blends of the present invention are also compared not only with Comparative Example B, but also two evaluations (Comparative Examples C and D) of a resin commercially available under the trae designation Equistar L-5005, (a product of the Equistar Corporation) are also performed. This product is an ethylene butene copolymer of about 0.949 g/cm$^3$ density and having a melt flow index, $I_{21}$ of 9.1 g/10 min and a melt flow index, $I_2$ of 0.057 g/10 min. The results are summarized in Table 4.

TABLE 4

Film Extrusion Performance.

| | Example 1 (average of 4 film evaluations) | Comp. Ex B (single evaluation) | Comp. Ex. C (single evaluation) | Comp. Ex D (average of 3 film evaluations) |
|---|---|---|---|---|
| Test # | Final Blend A | Final Blend B | Equistar L-5005 | Equistar L-5005 |
| Melt Temp ° F. (° C.) | 411 (211) | 413 (212) | 408 (209) | 409 (209) |
| Screw Amps | 65 | 76.0 | 66.0 | 64.00 |
| % Screw Amps Diff | 0.8% | 18.8% | 3.1% | 0.0% |
| Air Ring setting on the described equipment | 39 | 44.0 | 40.0 | 39.33 |
| Screw Speed (rpm) | 90 | 88.4 | 85 | 85.42 |
| Pressure (psig) | 5475 | 6090 | 5450 | 5200 |
| Pressure (MPa gauge) | 37.8 | 42 | 37.6 | 35.9 |
| % Pressure Diff | 5.30% | 17.60% | 4.80% | 0.00% |
| Rate (lb/hr) | 100 | 100.5 | 100.3 | 100.08 |
| Rate (kg/s) | 1.260E−02 | 1.266E−02 | 1.264E−02 | 1.261E−02 |
| Sp. Rate (lb/hr/rpm) | 1.11 | 1.14 | 1.18 | 1.17 |
| Sp. Rate (kg/s/rpm) | 1.4E−04 | 1.4E−04 | 1.5E−04 | 1.5E−04 |
| % Sp. Rate Diff | −4.90% | −3.00% | 0.50% | 0.00% |
| Flh (inches) | 42 | 42 | 42 | 42 |
| Flh (m) | 1.07E+00 | 1.07E+00 | 1.07E+00 | 1.07E+00 |
| Neck Height (inches) | 32 | 32 | 32 | 32 |
| Neck Height (m) | 8.13E−01 | 8.13E−01 | 8.13E−01 | 8.13E−01 |
| Wind Up (fpm) | 165 | 165 | 165 | 165 |
| Wind Up (m/s) | 0.84 | 0.84 | 0.84 | 0.84 |
| Avg Gauge (mils) | 0.5 | 0.5 | 0.5 | 0.5 |
| Avg Gauge (m) | 1.27E−05 | 1.27E−05 | 1.27E−05 | 1.27E−05 |
| BUR (low up ratio) | 4:01 | 4:01 | 4:01 | 4:01 |
| Layflat (inches) | 25 | 24.5 | 24.5 | 24.5 |
| Layflat (m) | 6.35E−01 | 6.22E−01 | 6.22E−01 | 6.22E−01 |
| Dart (grams) | 443 | 311 | 408 | 390 |
| % Dart Diff | 13.50% | −20.30% | 4.60% | 0.00% |
| Max Line Speed (fpm) | 255 | 260 | 295 | 281.67 |
| Max line Speed (m/s) | 1.295 | 1.32 | 1.498 | 1.432 |
| % Max Line Speed Diff | −9.50% | −7.70% | 4.70% | 0.00% |
| FAR (Static) | 40 | 30 | 40 | 40 |

Flh is frost line height, fpm is feet per minute.

Analysis of the data in Table 4 shows that, in comparison to a leading competitive resin, Equistar L-5005, improvements are apparent in the composition of the invention. Amp loads at the same output rate improve from an 18.8 percent deficiency to only a 0.8 percent deficiency. Head pressure, also measured at the same output rates, improve from a 17.6 percent deficiency to only a 5.3 percent deficiency. Dart impact increases from a 20.3 percent deficiency to a 13.5 percent improvement over the competitive resin. Both line speed and FAR remain about the same. An unexpected result is that the dart impact is from 10 to 100 percent improved over various competitive resins of the prior art when tested at several commercial size film extrusion lines at commercial output put rates. Thus, the resin of Example 1 can be very successfully extruded at a variety of commercially required line speeds.

Examples 2-42

Examples 2 through 42 are prepared as Example 1 using a mixing rate of 220 rpm, except that the tailoring and extrusion conditions are those shown in Table 5.

The products of Examples 2 to 42 are examined by Dynamic Mechanical Spectroscopy (DMS) using 1.5 g samples pressed into 1 inch (2.54 cm) circles 1.5 mm thick using a Tetrahedron Programmable Press. Each sample is sandwiched between two sheets of Mylar in a circular plaque and compression molded in a press at 350° F. (177° C.) for 5 minutes (300 s) under 1500 pounds (680 kg) of pressure over the total area of the specimen. The mold is opened and the sample in its plaque removed and allowed to cool to ambient temperature. When cooled, the sample is removed from the plaque. The sample is placed in a RMS-800 (Rheometric Mechanical Spectrometer) commercially available from Rheometrics, Inc. using the following settings:

parallel plate (25 mm fixtures)
gap setting of 1.4 to 2 mm
temperature @ 190° C.
strain ≈6 percent (inside the linear region)
initial frequency=0.01 (rad/s)
final frequency=100.0 (rad/s)
points per decade =5
delay before test=8 minutes (480 s)
mode=Dynamic The Mz of each of the products of Examples 2 to 42 are determined by gel permeation chromatography (GPC) using a refractive index detector. Additionally, the Mz+1 (BB) is determined using a chromatographic system having a high temperature chromatograph commercially available from Waters Corp. of Millford, Mass. under the model number 150C equipped with 4 Shodex HT 806M 13 micron ($13\times10^{-6}$ m) columns commercially available from Showa Denko K. K. and a 2-angle laser light scattering detector Model 2040 commercially available from Precision Detectors Co., using a 15-degree angle of light scattering. Data is collected using Viscotek TriSEC software version 3 and a 4-channel Viscotek Data Manager DM400. The system includes an on-line solvent degas device commercially available from Polymer Laboratories.

The carousel compartment is operated at 140° C. and the column compartment, at 150° C. The samples are prepared at a concentration of 0.1 grams of polymer in 50 milliliters of 1,2,4 trichlorobenzene solvent by stirring gently at 160° C. for 4 hours. The chromatographic solvent and the sample preparation solvent contain 200 ppm (0.02%) of butylated hydroxytoluene (BHT) and are nitrogen sparged. The injection volume is 200 microliters ($2\times10^{-4}$ l) and the flow rate is 0.63 ml/min ($6.3\times10^{-4}$ l/min or $1\times10^{-5}$ l/s).

The GPC column is calibrated using 21 narrow molecular weight distribution polystyrene standards with molecular weights ranging from 580 to 8,400,000 commercially available from Polymer Laboratories (Shropshire, UK). The polystyrene standard peak molecular weights are converted to polyethylene molecular weights using the equation described in Williams and Ward, *J. Polym. Sci., Polym. Let.*, 6, 621 (1968). Mz+1, also referred to as Mz+1 (BB), where BB indicates backbone, is calculated according to the method proposed by Yau and Gillespie *Polymer*, 42, 8947-8958 (2001).

The results of these tests are summarized in Table 5.

TABLE 5 conditions and properties of Examples 2-42

| Full label of data<br>Example number | Short label for subsequent pages<br>EX | 2 | 3 | 4 | 5 | 6 |
|---|---|---|---|---|---|---|
| Process Data | process | | | | | |
| Rate, kg/s | Rate (kg/s) | 5.13 | 5.12 | 5.11 | 5.11 | 5.11 |
| Oxygen Level, % | O2 % | 1.50 | 1.81 | 1.79 | 1.79 | 1.78 |
| Gate Position, % open | Gate % open | 39.30 | 36.20 | 36.20 | 36.20 | 39.53 |
| Calculated polymer temperature, ° C. | temp ° C. | 248.4 | 235.5 | 246.3 | 246.3 | 239.8 |
| extruder data | extruder | | | | | |
| SCREW AMPS | amps | 74 | 92 | 89 | 90 | 90 |
| PRESSURE (kPa) | Press. kPa | 37025 | 37025 | 37025 | 36818 | 36956 |
| AVG GAUGE (m) | Gauge (m) | 1.482E−05 | 1.376E−05 | 1.461E−05 | 1.355E−05 | 1.439E−05 |
| DART (GRAMS) | Dart (g) | 429 | 438 | 441 | 441 | 486 |
| Vertical Bubble Stability* m/s | Stability* m/s | 1.57 | 1.52 | 1.68 | 1.52 | 1.70 |
| I21 (g/10 min) | I21 | 9.73 | 9.250 | 9.370 | nm | 9.410 |
| I5 (g/10 min) | I5 | 0.380 | 0.360 | 0.370 | nm | 0.380 |
| I21/I5 | I21/I5 | 25.605 | 25.694 | 25.324 | | 24.763 |
| GPC data | GPC | | | | | |
| Mz | Mz | 9.50E+05 | 1.02E+06 | 1.13E+06 | 1.24E+06 | 1.10E+06 |
| Mz + 1(BB) | Mz + 1(BB) | 2.02E+06 | 2.18E+06 | 2.19E+06 | 2.15E+06 | 2.20E+06 |
| RMS Rheology Data @ 190 C. | rheology | | | | | |
| Viscosity (Pa · s) @ 0.1 sec-1 shear rate | Pa · s @ 0.1 s-1 | 1.01E+05 | 1.00E+05 | 9.82E+04 | 9.88E+04 | 1.01E+05 |

TABLE 5-continued

| Viscosity (Pa·s) @ 0.1 sec-1 shear rate | Pa·s @ 100 s-1 | 2.34E+03 | 2.42E+03 | 2.32E+03 | 2.33E+03 | 2.36E+03 |
|---|---|---|---|---|---|---|
| G'/G" @ 0.01 sec-1 shear rate | G'/G" | 0.666 | 0.591 | 0.604 | 0.595 | 0.6 |

| Full label of data | Short label for subsequent pages | | | | |
|---|---|---|---|---|---|
| Example number | EX | 7 | 8 | 9 | 10 |
| Process Data | process | | | | |
| Rate, kg/s | Rate (kg/s) | 5.11 | 5.10 | 5.11 | 4.73 |
| Oxygen Level, % | O2 % | 2.00 | 1.72 | 2.14 | 1.70 |
| Gate Position, % open | Gate % open | 39.53 | 39.30 | 39.53 | 39.30 |
| Calculated polymer temperature, ° C. | temp ° C. | 238.8 | 245.3 | 245.9 | 253.6 |
| extruder data | extruder | | | | |
| SCREW AMPS | amps | 91 | 82 | 92 | 82 |
| PRESSURE (kPa) | Press. kPa | 38128 | 37714 | 38542 | 37370 |
| AVG GAUGE (m) | Gauge (m) | 1.482E-05 | 1.524E-05 | 1.418E-05 | 1.524E-05 |
| DART (GRAMS) | Dart (g) | 522 | 379 | 438 | 378 |
| Vertical Bubble Stability* m/s | Stability* m/s | 1.65 | 1.32 | 1.37 | 1.40 |
| I21 (g/10 min) | I21 | 8.660 | nm | nm | 9.270 |
| I5 (g/10 min) | I5 | 0.310 | nm | nm | 0.320 |
| I21/I5 | I21/I5 | 27.935 | | | 28.969 |
| GPC data | GPC | | | | |
| Mz | Mz | 1.15E+06 | 1.26E+06 | 1.24E+06 | 1.06E+06 |
| Mz + 1(BB) | Mz + 1(BB) | 2.14E+06 | 2.00E+06 | 2.27E+06 | 2.02E+06 |
| RMS Rheology Data @ 190 C. | rheology | | | | |
| Viscosity (Pa·s) @ 0.1 sec-1 shear rate | Pa·s @ 0.1 s-1 | 1.08E+05 | 1.11E+05 | 1.18E+05 | 1.13E+05 |
| Viscosity (Pa·s) @ 0.1 sec-1 shear rate | Pa·s @ 100 s-1 | 2.40E+03 | 2.35E+03 | 2.51E+03 | 2.34E+03 |
| G'/G" @ 0.01 sec-1 shear rate | G'/G" | 0.625 | 0.733 | 0.669 | 0.749 |

| EX | 11 | 12 | 13 | 14 | 15 | 16 | 17 | 18 | 19 |
|---|---|---|---|---|---|---|---|---|---|
| Process | | | | | | | | | |
| Rate (kg/s) | 5.09 | 5.12 | 4.86 | 4.19 | 5.12 | 5.11 | 5.11 | 4.87 | 5.12 |
| O2 % | 2.09 | 2.11 | 2.32 | 0.00 | 2.27 | 2.29 | 2.29 | 2.5 | 2.29 |
| Gate % open | 39.53 | 39.54 | 39.57 | 39.55 | 39.54 | 31.17 | 25.49 | 40 | 43.73 |
| temp ° C. | 240.7 | 239.1 | 243.2 | 210.5 | 198.4 | 203.7 | 209.8 | 238.6 | 237.6 |
| extruder | | | | | | | | | |
| amps | 93 | 92 | 76 | 84 | 89 | 87 | 89 | 85 | 87 |
| Press. kPa | 38749 | 37576 | 37783 | 37163 | 37025 | 36129 | 36404 | 36749 | 36818 |
| Gauge (m) | 1.524E-05 | 1.524E-05 | Nm | nm | nm | nm | nm | nm | nm |
| Dart (g) | 474 | 444 | 468 | 464 | 393 | 441 | 486 | 471 | 498 |
| Stability* m/s | 1.40 | 1.37 | 1.52 | 1.17 | 1.52 | 1.50 | 1.55 | 1.52 | 1.52 |
| I21 | 8.030 | 8.520 | nm | 9.32 | 9.660 | 9.640 | 9.79 | 9.23 | nm |
| I5 | 0.270 | 0.300 | nm | 0.350 | 0.330 | 0.360 | 0.35 | 0.33 | nm |
| I21/I5 | 29.741 | 28.400 | | 26.629 | 29.273 | 26.778 | 27.971 | 27.970 | 0 |
| GPC | | | | | | | | | |
| Mz | 1.14E+06 | 1.33E+06 | 1.15E+06 | 2.11E+06 | 1.21E+06 | 1.21E+06 | 1.30E+06 | 1.11E+06 | 1.25E+06 |
| Mz + 1(BB) | 2.23E+06 | 2.24E+06 | 2.27E+06 | 2.32E+06 | 2.29E+06 | 2.17E+06 | 2.19E+06 | 2.13E+06 | 2.20E+06 |
| rheology | | | | | | | | | |
| Pa·s @ 0.1 s-1 | 1.21E+05 | 1.13E+05 | 1.15E+05 | 9.92E+04 | 1.01E+05 | 9.85E+04 | 9.84E+04 | 1.11E+05 | 1.09E+05 |
| Pa·s @ 100 s-1 | 2.47E+03 | 2.38E+03 | 2.41E+03 | 2.39E+03 | 2.40E+03 | 2.36E+03 | 2.36E+03 | 2.34E+03 | 2.37E+03 |
| G'/G" | 0.666 | 0.643 | 0.661 | 0.454 | 0.475 | 0.468 | 0.478 | 0.663 | 0.637 |

| EX | 20 | 21 | 22 | 23 | 24 | 25 | 26 | 27 |
|---|---|---|---|---|---|---|---|---|
| Process | | | | | | | | |
| Rate (kg/s) | 4.87 | 5.00 | 5.00 | 4.99 | 5.00 | 4.99 | 4.61 | 4.99 |
| O2 % | 2.52 | 2.52 | 2.52 | 3.02 | 4.02 | 4.02 | 3.42 | 3.41 |
| Gate % open | 39.97 | 39.97 | 39.97 | 39.97 | 35.97 | 35.97 | 35.97 | 35.97 |
| temp ° C. | 245.4 | 245.2 | 245.2 | 241.3 | 250.6 | 247.8 | 249.8 | 241.3 |
| extruder | | | | | | | | |
| amps | 83 | 84 | 89 | 92 | 86 | 85 | 83 | 75 |
| Press. kPa | 37025 | 37094 | 37094 | 37094 | 36404 | 36749 | 36542 | 37232 |
| Gauge (m) | nm | nm | nm | nm | nm | nm | nm | Nm |
| Dart (g) | 426 | 471 | 450 | 438 | 330 | 252 | 387 | 345 |
| Stablity* m/s | 1.52 | 1.52 | 1.57 | 1.73 | 1.73 | 1.83 | 1.78 | 1.57 |
| I21 | 9.66 | nm | nm | 9.44 | 9.58 | 9.19 | 9.36 | 9.24 |
| I5 | 0.32 | nm | nm | 0.31 | 0.32 | 0.3 | 0.3 | 0.3 |
| I21/I5 | 30.188 | | | 30.452 | 29.938 | 30.633 | 31.200 | 30.800 |
| GPC | | | | | | | | |
| Mz | 1.12E+06 | 1.19E+06 | 1.06E+06 | 1.15E+06 | 1.11E+06 | 1.11E+06 | 1.12E+06 | 1.13E+06 |

TABLE 5-continued

| Mz + 1(BB) rheology | 2.17E+06 | 2.25E+06 | 2.18E+06 | 2.12E+06 | 2.18E+06 | 2.15E+06 | 2.05E+06 | 2.21E+06 |
|---|---|---|---|---|---|---|---|---|
| Pa·s @ 0.1 s-1 | 1.13E+05 | 1.20E+05 | 1.13E+05 | 1.20E+05 | 1.25E+05 | 1.25E+05 | 1.04E+05 | 1.25E+05 |
| Pa·s @ 100 s-1 | 2.34E+03 | 2.40E+03 | 2.37E+03 | 2.34E+03 | 2.39E+03 | 2.40E+03 | 2.23E+03 | 2.42E+03 |
| G'/G" | 0.681 | 0.703 | 0.668 | 0.725 | 0.777 | 0.772 | 0.696 | 0.767 |

| EX | 28 | 29 | 30 | 31 | 32 | 33 | 34 | 35 | 36 |
|---|---|---|---|---|---|---|---|---|---|
| process | | | | | | | | | |
| Rate (kg/s) | 5.00 | 4.99 | 4.73 | 4.62 | 4.58 | 4.61 | 4.86 | 5.11 | 5.11 |
| O2 % | 3.17 | 3.18 | 3.19 | 3.19 | 3.02 | 3.04 | 2.78 | 2.81 | 2.60 |
| Gate % open | 35.97 | 35.97 | 35.97 | 35.97 | 35.97 | 35.97 | 35.97 | 35.98 | 35.99 |
| temp °C. extruder | 240.1 | 241.1 | 252.2 | 255.6 | 253.8 | 256.0 | 248.2 | 239.5 | 245.8 |
| amps | 75 | 74 | 72 | 73 | 74 | 72 | 71 | 72 | 70 |
| Press. kPa | 37025 | 36956 | 37783 | 37921 | 38197 | 38059 | 37645 | 37783 | 37439 |
| Gauge (m) | nm | nm | nm | nm | nm | nm | Nm | nm | nm |
| Dart (g) | 367 | 420 | 360 | 354 | 348 | 315 | 390 | 366 | 441 |
| Stability* m/s | 1.52 | 1.83 | 1.83 | 1.83 | 1.78 | 1.73 | 1.57 | 1.57 | 1.57 |
| I21 | 9.1 | 9.14 | 9.72 | 8.44 | 8.13 | 8.15 | 8.14 | 8.65 | 8.79 |
| I5 | 0.3 | 0.29 | 0.28 | 0.27 | 0.27 | 0.27 | 0.34 | 0.29 | 0.29 |
| I21/I5 | 30.333 | 31.517 | 34.714 | 31.259 | 30.111 | 30.185 | 23.941 | 29.828 | 30.310 |
| GPC | | | | | | | | | |
| Mz | 1.13E+06 | 1.15E+06 | 9.89E+05 | 9.82E+05 | 1.09E+06 | 9.55E+05 | 9.67E+05 | 1.03E+06 | 1.17E+06 |
| Mz + 1(BB) Rheology | 2.18E+06 | 2.04E+06 | 1.99E+06 | 1.78E+06 | 1.94E+06 | 1.85E+06 | 1.97E+06 | 1.96E+06 | 1.94E+06 |
| Pa·s @ 0.1 s-1 | 1.20E+05 | 1.19E+05 | 1.20E+05 | 1.26E+05 | 1.30E+05 | 1.31E+05 | 1.26E+05 | 1.26E+05 | 1.24E+05 |
| Pa·s @ 100 s-1 | 2.37E+03 | 2.22E+03 | 2.13E+03 | 2.23E+03 | 2.33E+03 | 2.29E+03 | 2.40E+03 | 2.45E+03 | 2.39E+03 |
| G'/G" | 0.739 | 0.709 | 0.767 | 0.784 | 0.761 | 0.788 | 0.755 | 0.734 | 0.753 |

| EX | 37 | 38 | 39 | 40 | 41 | 42 |
|---|---|---|---|---|---|---|
| process | | | | | | 163 |
| Rate (kg/s) | 4.86 | 4.86 | 4.89 | 4.87 | 4.84 | 4.74 |
| O2 % | 2.61 | 2.58 | 2.65 | 2.59 | 2.60 | 2.58 |
| Gate % open | 35.97 | 35.97 | 35.97 | 35.97 | 35.97 | 39.73 |
| temp °C. extruder | 244.9 | 246.4 | 243.9 | 247.9 | 242.0 | 244.6 |
| amps | 70 | 67 | 67 | 68 | 69 | 68 |
| Press. kPa | 35991 | 36060 | 35715 | 36129 | 36197 | 36680 |
| Gauge (m) | nm | nm | nm | nm | nm | nm |
| Dart (g) | 378 | 405 | 372 | 387 | 357 | 324 |
| Stability* m/s | 1.63 | 1.63 | 1.63 | 1.68 | 1.68 | 1.63 |
| I21 | 9.91 | 9.98 | 9.96 | 9.86 | 9.55 | 8.93 |
| I5 | 0.32 | 0.32 | 0.32 | 0.31 | 0.3 | 0.28 |
| I21/I5 | 30.969 | 31.188 | 31.125 | 31.806 | 31.833 | 31.893 |
| GPC | | | | | | |
| Mz | 1.02E+06 | 1.22E+06 | 1.15E+06 | 1.04E+06 | 1.12E+06 | 1.04E+06 |
| Mz + 1(BB) Rheology | 1.91E+06 | 2.01E+06 | 2.01E+06 | 1.99E+06 | 1.92E+06 | 1.84E+06 |
| Pa·s @ 0.1 s-1 | 1.18E+05 | 1.19E+05 | 1.20E+05 | 1.18E+05 | 1.18E+05 | 1.24E+05 |
| Pa·s @ 100 s-1 | 2.27E+03 | 2.35E+03 | 2.31E+03 | 2.31E+03 | 2.28E+03 | 2.34E+03 |
| G'/G" | 0.781 | 0.713 | 0.759 | 0.734 | 0.751 | 0.764 |

*Alpine film line vertical bubble stability
nm = not measured and E is exponent to the base 10.

The data in Table 5 are statistically fitted to an equation using JMP Statistical Software commercially available from SAS Institute. The resulting equation is: Alpine film line vertical bubble stability (in ft/min)=275.05−0.000081*Mz+0.0000735*Mz+1 (BB)+0.0001312*viscosity (P) @ 0.1 sec$^{-1}$ shear rate+1.0033E−9*(viscosity (P) @ 0.1 sec$^{-1}$ shear rate)$^2$−0.026764*viscosity (P) @ 100 sec$^{-1}$ shear rate [where (BB) is backbone, P is poise, and E is exponent of base 10]. Converted to SI units the equation is: Alpine film line vertical bubble stability (in m/s)={0.005 } {275.05−0.000081*Mz+0.0000735*Mz+1 (BB)+(0.0001312*0.1*viscosity (Pa·s) @ 0.1 sec$^{-1}$ shear rate)+1.0033E−9*[(0.1) (viscosity (Pa·s) @ 0.1 sec$^-$shear rate)]$^2$−(0.026764*0.1*viscosity (Pa·s) @ 100 sec$^{-1}$ shear rate)}. Alpine film line is the combination of extruding equipment defined previously commercially available from Hosokawa Alpine Corporation.

Thus, vertical bubble stability on this film line is correlated with 5 parameters. These are: the Mz average molecular weight moment and Mz+1 average molecular weight moment, both obtained using GPC, the viscosity at a shear rate of 0.1 sec$^{-1}$ and its squared term which shows curvature in the relationship beyond linearity, and finally the viscosity at 100 sec$^{-1}$ shear rate. Bubble stability decreases when the Mz average molecular weight moment increases or the viscosity at 100 sec$^{-1}$ increases. Bubble stability increases when the Mz+1 average molecular weight moment increases or the viscosity at the low shear rate of 0.1 sec$^{-1}$ increases or the square of this parameter. When the viscosity at low shear rates is increased (from the increase in the polymer molecular weight at the highest molecular weight moment, that is Mz+1) the bubble stability increases more rapidly due to the presence of the viscosity squared term. This also increases the molecular weight distribution. The other two parameters indicate that the converse is true that the bubble stability is reduced when the lower molecular weight species as measured by the Mz average molecular weight moment is increased as compared to the Mz+1 average molecular weight moment but only linearly. This also reflects a narrower molecular weight distribution. Correlation of the vertical bubble stability on this film extrusion line with the measurable basic material science properties of the composition indicates that bubble stability on this line can be correlated with the stability on other film extrusion lines.

Dart Drop is calculated using the equation: Dart drop (g)=469.9−54.8*(G'/G"@0.01 shear rate)−91.4 (G'/G"@ 0.01 shear rate)$^2$.

Long Chain Branching in Examples 2-42

Long chain branching of Examples 2-42 was determined as described by Zimm, G. H. and Stockmayer, W. H., *J Chem. Phys.*, 17, 1301 (1949) and Rudin, A., *Modern Methods of Polymer Characterization*, John Wiley & Sons, New York (1991) pp. 103-112 and is reported in Table 6.

TABLE 6

Long Chain Branching (LCB) of Examples 2-42

| | \multicolumn{11}{c}{Example} |
|---|---|---|---|---|---|---|---|---|---|---|---|
| | 2 | 3 | 4 | 5 | 6 | 7 | 8 | 9 | 10 | 11 | 12 |
| LCB | 0.027 | 0.054 | 0.073 | 0.097 | 0.081 | 0.02 | 0.057 | 0.036 | 0.018 | 0.015 | 0.077 |

| | Example | | | | | | | | | |
|---|---|---|---|---|---|---|---|---|---|---|
| | 13 | 14 | 15 | 16 | 17 | 18 | 19 | 20 | 21 | 22 |
| LCB | 0.014 | 0.098 | nm | 0.017 | 0.02 | 0.036 | 0.04 | 0.04 | nm | 0.017 |

| | Example | | | | | | | | | |
|---|---|---|---|---|---|---|---|---|---|---|
| | 23 | 24 | 25 | 26 | 27 | 28 | 29 | 30 | 31 | 32 |
| LCB | nm | 0.019 | 0.043 | 0.04 | 0.059 | 0.04 | 0.057 | 0.011 | 0.034 | 0.031 |

| | Example | | | | | | | | | |
|---|---|---|---|---|---|---|---|---|---|---|
| | 33 | 34 | 35 | 36 | 37 | 38 | 39 | 40 | 41 | 42 |
| LCB | nm | 0.032 | 0.039 | 0.04 | 0.025 | 0.02 | 0.031 | nm | 0.06 | 0.014 | nm is not measurable or not measured
LCB is in branches of at least 6 carbons in length per 1000 carbon atoms.

The data in Table 6 shows that most of Examples 2-42 exhibit long chain branching of between 0.01 and 0.1 indicative of light crosslinking introduced by tailoring.

Example 43 and Comparative Example E

A resin of the invention, Example 43 is prepared as in Example 1. Comparative Example E is a resin used to make corrugated pipe commercially available from The Dow Chemical Company under the trade designation DGDA-2475. Plaques are made from each resin according to ASTM-D-4703, procedure C. and slowly cooled at 15° C./min. The resulting properties are measured according to the procedures of the tests listed in Table 7.

TABLE 7

Properties Useful for Fabricated Articles

| Test Property | Test Method | Example 43 | Comp. Ex. E | Improvement |
|---|---|---|---|---|
| Product Name | | | DGDA-2475 | |
| MI2 | ASTM D-1238 (190° C., 2.16 kg) | 0.06 | 0.17 | |
| MI21 | ASTM D-1238 (190° C., 21.6 kg) | 9.0 | 21 | |
| MFR (MI21/MI2) | | 150 | 123.5 | |
| Density (g/cc) | ASTM D-1505 | 0.9480 | 0.9525 | |
| Yield Strength (psi) | ASTM D-638 | 3100 | 3500 | |
| Yield Strength (kPa) | | 21000 | 24000 | |
| Tensile Strength (psi) | ASTM D-638 | 5800 | 4600 | |
| Tensile Strength (kPa) | | 40000 | 31700 | |

TABLE 7-continued

Properties Useful for Fabricated Articles

| Test Property | Test Method | Example 43 | Comp. Ex. E | Improvement |
|---|---|---|---|---|
| Flexural Modulus (psi) | ASTM D-790 | 185000 | 140000 | |
| Flexural Modulus (kPa) | | 1276000 | 965000 | |
| NCLS (hrs) | ASTM F-2136 | >6000 | 30 | 200 X |
| Flexural Modulus per unit density | | 195147 | 146981 | 1.3 X |
| Flex. Modulus/density (kPa · cm$^3$/g) [kPa · m$^3$/kg] | | 1350000 [1350] | 1010000 [1010] | 1.3 X |

Where X means times

The data in Table 7 shows that flexural modulus of a blend of the invention is greater than that of a sample of polymer commercially used to make corrugated pipe even though the density of the blend of the invention is significantly lower, resulting in about a 30 percent improvement in flexural modulus to density ratio. The crack growth is improved more than two orders of magnitude while the yield and tensile strengths are similar.

The invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims.

The invention claimed is:

1. A multimodal polyethylene composition having;
   1) a density of at least about 0.940 g/cm$^3$ as measured by ASTM Method D-1505;
   2) a melt flow index ($I_5$) of from about 0.2 to about 1.5 g/10 min (as measured by ASTM D-1238, measured at 190° C. and 5 kilograms);
   3) a melt flow index ratio ($I_{21}/I_5$) of from about 20 to about 50;
   4) a molecular weight distribution, Mw/Mn, of from about 20 to about 40; and
   5) a bubble stability measured on an HS50S stationary extrusion system with an BF 10-25 die, HK 300 air ring, A8 take off, and WS8 surface winder, all commercially available from Hosokawa Alpine Corporation, with a 100 mm die diameter having a 50 mm 21:1 L/D grooved feed extruder used according to the conditions described herein of a film of about 6×10$^{-6}$ m thickness of at least about 1.22 m/s line speed, at least about 45 kg/hr (0.013 kg/sec) output rate, or at least about 0.5 lb/hr/rpm (0.0000011 kg/s/rps) specific output rate or a combination thereof;
   6) a dart impact on 12.5 micron (1.25×10$^{-5}$ m) film of at least 300 g; measured according to ASTM 1709, Method A;
the composition comprising a blend comprising;
   A) a high molecular weight fraction which;
      a) is present in an amount of from about 30 to about 70 weight percent (based on the total weight of the composition);
      b) has a density of at least about 0.860 g/cm$^3$ as measured by ASTM D-1505;
      c) has a melt flow index ($I_{21}$) of from about 0.01 to about 50 g/10 min (as measured by ASTM D-1238, measured at 190° C. and 21.6 kilograms); and
      d) a melt flow index ratio ($I_{21}/I_5$) of from about 6 to about 12; and
   B) a low molecular weight fraction which;
      a) is present in an amount of from about 30 to about 70 weight percent (based on the total weight of the composition);
      b) has a density of at least about 0.900 g/cm$^3$ as measured by ASTM D-1505;
      c) has a melt flow index ($I_2$) of from about 0.5 to about 3000 g/10 min (as measured by ASTM D-1238, measured at 190° C. and 2.16 kilograms);
      d) a melt flow index ratio ($I_{21}/I_5$) of from about 5 to about 15; and
      e) is prepared using a mole ratio of alpha olefin to ethylene less than that in the high molecular weight fraction of less than or equal to about 0.01:1;
wherein said blend is melted in an extruder having a mixer vent, wherein the mixer vent has an oxygen concentration of from about 0.05 to about 6 volume percent oxygen in nitrogen; and the extrusion temperature is sufficient to melt the blend and result in tailoring the blend in the presence of the oxygen; and wherein said molten blend is passed through one or more active screens, wherein in the case of two or more active screens, the screens are positioned in series, each active screen having a micron retention size of from about 2 to about 70, at a mass flux of about 5 to about 100 lb/hr/in$^2$ (1.0 to 20 kg/s/m$^2$) to form a screened molten polymer blend.

2. The multimodal polyethylene composition of claim 1 wherein;
   1) the density is from about 0.945 to about 0.955 g/cm$^3$;
   2) the melt flow index ($I_5$) is of from about 0.25 to about 1.0 g/10 min;
   3) the melt flow index ratio ($I_{21}/I_5$) is of from about 24 to about 40;
   4) the molecular weight distribution, Mw/Mn is from about 22 to about 38; and
   5) the bubble stability is greater than about 1.32 m/s line speed or from about 0.0000017 to 0.000027 kg/s/rps specific output rate or a combination thereof;
the composition comprising a blend comprising;
   A) a high molecular weight fraction which;
      a) is present in an amount of from about 40 to about 60 weight percent (based on the total weight of the composition);
      b) has a density of from about 0.890 to about 0.940 g/cm$^3$;
      c) has a melt flow index ($I_{21}$) of from about 0.2 to about 12 g/10 min; and
      d) a melt flow index ratio ($I_{21}/I_5$) of from about 7 to about 12; and B) a low molecular weight fraction which;
   a) is present in an amount of from about 40 to about 60 weight percent (based on the total weight of the composition);
   b) has a density of from about 0.910 to about 0.975 g/cm$^3$;
   c) has a melt flow index ($I_2$) of from about 1.0 to about 1,000 g/10 min;
   d) a melt flow index ratio ($I_{21}/I_5$) of from about 6 to about 12; and
   e) the ratio of alpha olefin to ethylene is less than that in the high molecular weight fraction and less than or equal to about 0.01:1;

wherein said blend is melted in an extruder having a mixer vent, wherein the mixer vent has an oxygen concentration of from about 0.05 to about 6 volume percent oxygen in nitrogen; and the extrusion temperature is sufficient to melt the blend and result in tailoring the blend in the presence of the oxygen; and wherein said molten blend is passed through one or more active screens, wherein in the case of two or more active screens, the screens are positioned in series, each active screen having a micron retention size of from about 2 to about 70, at a mass flux of about 5 to about 100 lb/hr/in$^2$ (1.0 to 20 kg/s/m$^2$) to form a screened molten polymer blend.

3. The multimodal polyethylene composition of claim 2 wherein;
1) the molecular weight measured by Gel Permeation Chromatography is from about 90,000 to about 420,000.
2) the bubble stability is reflected in an output rate of from about 0.013 to 0.13 kg/s; the composition comprising;
   A) a high molecular weight fraction which;
      a) has a melt flow index ($I_{21}$) of from about 0.2 to about 0.4 g/10 min; and
      b) a molecular weight of from about 135,000 to about 445,000;
      c) is prepared using a mole ratio of alpha olefin to ethylene of from about 0.02:1 to about 0.35:1 and
   B) a low molecular weight fraction which;
      a) has a density of from about 0.970 to about 0.975 g/cm$^3$;
      b) has a molecular weight of from about 15,800 to about 35,000; and
      c) is prepared using a mole ratio of alpha olefin to ethylene of less than or equal to about 0.007:1.

4. The multimodal polyethylene composition of any of claims 1 through 3 wherein the composition is tailored sufficiently to produce an increase of melt flow ratio ($I_{21}/I_5$) of from about 1 to about 4 units as compared with the same composition without tailoring.

5. The multimodal polyethylene composition of any of claims 1 through 3 which;
   i) when fabricated into a film of 0.5 mils (1.27×10$^{-5}$ m) thickness, has a dart impact of greater than about 400 g;
   ii) when fabricated into a film of 1.0 mils (2.54×10$^{-5}$ m) thickness, has a film appearance rating of greater than or equal to 20; and
   iii) when fabricated into a blown film has (a) a bubble stability of at least about 240 ft/min (1.22 m/s) line speed, (b) can be used to produce blown film of 6 micron (6×10$^{-6}$ m) thickness at actual output rates of from about 50 to about 1100 lb/hr (0.0063 to 0.14 kg/s) or (c) specific output rates of from about 0.5 to about 15 lb/hr/rpm (1.05×10$^{-6}$ to 3.15×10$^{-5}$ kg/s/rps), or a combination of at least 2 of (a) (b) and (c).

6. The multimodal polyethylene composition of claim 1 produced by a process comprising:
1) contacting in a first gas phase fluidized bed reactor under polymerization conditions and at a temperature of from about 70° C. to about 110° C., a supported titanium magnesium catalyst precursor, cocatalyst, and a gaseous composition, the gaseous composition having;
   i) a mole ratio of alpha-olefin to ethylene of from about 0.01:1 to about 0.8:1; and optionally
   ii) a mole ratio of hydrogen (if present) to ethylene of from about 0.001:1 to about 0.3:1,
to produce a high molecular weight polymer(HMW); and
2) transferring the HMW polymer from step 1 to a second gas phase fluidized bed reactor under polymerization conditions and at a temperature of from about 70° C. to about 110° C., with a gaseous composition having;
   i) a mole ratio of alpha-olefin to ethylene of from about 0:0005:1 to about 0.01:1; and
   ii) a mole ratio of hydrogen (if present) to ethylene of from about 0.01:1 to about 3:1
to form a polymer blend product; and
3) melting the polymer blend product in an extruder having a mixer vent wherein;
   i) the mixer vent has an oxygen concentration of from about 0.05 to about 6 volume percent oxygen in nitrogen; and
   ii) the extrusion temperature is sufficient to melt the polymer and result in tailoring in the presence of the oxygen; and
4) passing the molten polymer blend through one or more active screens, wherein in the case of two or more active screens, the screens are positioned in series, each active screen having a micron retention size of from about 2 to about 70, at a mass flux of about 5 to about 100 lb/hr/in$^2$ (1.0 to 20 kg/s/m$^2$) to form a screened molten polymer blend.

7. The multimodal polyethylene composition of claim 6 wherein in the process;
1) the gaseous composition in step 1) has;
   i) a mole ratio of alpha-olefin to ethylene of from about 0.02:1 to about 0.35:1; and
   ii) a mole ratio of hydrogen (if present) to ethylene of from about 0.01:1 to about 0.2:1, and
2) the gaseous composition in step 2) has;
   i) a mole ratio of alpha-olefin to ethylene of from about 0.001:1 to about 0.007:1; and optionally
   ii) a mole ratio of hydrogen (if present) to ethylene of from about 0.5:1 to about 2.2:1; and
wherein
3) the ratio of the weight of polymer prepared in the first gas phase reactor used in step 1) to the weight of polymer prepared in the second gas phase reactor used in step 2) is in the range of about 30:70 to about 70:30.

8. The multimodal polyethylene composition of claim 6 or 7 which, when fabricated into a film using a HS50S stationary extrusion system with an BF 10-25 die, HK 300 air ring, A8 take off, and WS8 surface winder, all commercially available from Hosokawa Alpine Corporation, with a 100 mm die diameter having a 50 mm 21:1 L/D grooved feed extruder has a vertical bubble stability described by:

Alpine film line vertical bubble stability (in ft/min)= 275.05−0.000081*Mz+0.0000735*Mz+1 (BB)+ (0.0001312*viscosity (P) @ 0.1 sec$^{-1}$ shear rate+ 1.0033E-9*(viscosity (P) @ 0.1 sec$^{-1}$ shear rate)$^2$− 0.026764*viscosity (P) @ 100 sec$^{-1}$ shear rate [where (BB) is backbone, B is exponent of base 10] or Alpine film line vertical bubble stability (in m/s)= {0.005}{275.05−0.000081*Mz+0.0000735*Mz+1 (BB)+(0.0001312*0.1*viscosity (Pa·s) @ 0.1 sec$^{-1}$ shear rate)+1.0033E-9*[(0.1) (viscosity (Pa·s) @ 0.1 sec$^{-1}$ shear rate)]$^2$−(0.026764*0.1*viscosity (Pa·s) @ 100 sec$^{-1}$ shear rate)}.

9. The multimodal polyethylene composition of claim 6 or 7 wherein when made into a film has a Dart Drop calculatable using the equation: Dart drop (g)=469.9−54.8*(G'/G"@ 0.01 shear rate)−91.4 (G'/G"@ 0.01 shear rate)$^2$.

10. The multimodal polyethylene composition of claim 1, wherein said multimodal composition has a NCLS of at least 2400 hours, a ratio of flexural modulus to density of at least 1140 kPa*m$^3$/kg, and an $I_{21}/I_2$ of at least 90.

11. The multimodal polyethylene composition of claim 1, wherein said multimodal composition has a NCLS of at least 2400 hours, and a ratio of flexural modulus to density of at least 1140 kPa*m$^3$/kg produced by a process comprising:
1) contacting in a first gas phase fluidized bed reactor under polymerization conditions and at a temperature of from about 70° C. to about 110° C., a supported titanium magnesium catalyst precursor, cocatalyst, and a gaseous composition, the gaseous composition having;
   i) a mole ratio of alpha-olefin to ethylene of from about 0.01:1 to about 0.8:1; and optionally
   ii) a mole ratio of hydrogen (if present) to ethylene of from about 0.001:1 to about 0.3:1,
   to produce a high molecular weight polymer (HMW); and
2) transferring the HMW polymer from step 1 to a second gas phase fluidized bed reactor under polymerization conditions and at a temperature of from about 70° C. to about 110° C., with a gaseous composition having;
   i) a mole ratio of alpha-olefin to ethylene of from about 0:0005:1 to about 0.01:1; and
   ii) a mole ratio of hydrogen (if present) to ethylene of from about 0.01:1 to about 3:1
   to form a polymer blend product; and
3) melting the polymer blend product in an extruder having a mixer vent wherein;
   i) the mixer vent has an oxygen concentration of from about 0.05 to about 6 volume percent oxygen in nitrogen; and
   ii) the extrusion temperature is sufficient to melt the polymer and result in tailoring in the presence of the oxygen; and
4) passing the molten polymer blend through one or more active screens, wherein in the case of two or more active screens, the screens are positioned in series, each active screen having a micron retention size of from about 2 to about 70, at a mass flux of about 5 to about 100 lb/hr/in$^2$ (1.0 to 20 kg/s/m$^2$) to form a screened molten polymer blend.

* * * * *